United States Patent
Linnell et al.

(10) Patent No.: US 10,201,903 B1
(45) Date of Patent: Feb. 12, 2019

(54) PUNCH-IN / PUNCH-OUT SMOOTHING FOR TAKEOVER OF AUTOMATED MOVEMENT WITH HAPTIC CONTROLLER

(71) Applicant: Verily Life Sciences LLC, Mountain View, CA (US)

(72) Inventors: Jeffrey Linnell, San Francisco, CA (US); Anthony Sean Jules, Oakland, CA (US)

(73) Assignee: Verily Life Sciences LLC, Mountain View, CA (US)

( * ) Notice: Subject to any disclaimer, the term of this patent is extended or adjusted under 35 U.S.C. 154(b) by 328 days.

(21) Appl. No.: 14/920,592

(22) Filed: Oct. 22, 2015

(51) Int. Cl.
| | |
|---|---|
| B25J 13/08 | (2006.01) |
| G06F 3/01 | (2006.01) |
| G06F 3/041 | (2006.01) |
| G06F 3/0362 | (2013.01) |
| G06F 3/0488 | (2013.01) |
| B25J 13/02 | (2006.01) |

(52) U.S. Cl.
CPC ............. *B25J 13/084* (2013.01); *B25J 13/02* (2013.01); *B25J 13/085* (2013.01); *G06F 3/016* (2013.01); *G06F 3/0362* (2013.01); *G06F 3/041* (2013.01); *G06F 3/04883* (2013.01); *G06F 2203/014* (2013.01); *G06F 2203/04808* (2013.01)

(58) Field of Classification Search
None
See application file for complete search history.

(56) References Cited

U.S. PATENT DOCUMENTS

| | | |
|---|---|---|
| 5,004,391 A | 4/1991 | Burdea |
| 5,587,937 A | 12/1996 | Massie et al. |
| 6,833,846 B2 | 12/2004 | Hasser |
| 8,531,392 B2 | 9/2013 | Branton et al. |
| 8,639,386 B2 | 1/2014 | Summer et al. |
| 9,069,396 B2 | 6/2015 | Adler et al. |

(Continued)

FOREIGN PATENT DOCUMENTS

JP 2005068935 A 3/2005

OTHER PUBLICATIONS

Badescu, Mircea; Wampler, Charles; Mavroidis, Constantino; "Rotary Haptic Knob for Vehicular Instrument Controls"; Proceedings of the 10th Symp. On Haptic Interfaces for Virtual Envir. & Teleoperator Systs. (Haptics'02); 2002; IEEE.

(Continued)

*Primary Examiner* — Mohammad Ali
*Assistant Examiner* — Saad M Kabir
(74) *Attorney, Agent, or Firm* — McDonnell Boehnen Hulbert & Berghoff LLP

(57) ABSTRACT

Example implementations relate to punch-in transitions to smoothly transition operation of parts of a robotic system from control tracks to real-time input, such as to smoothly transition a control track rotating a knob at a handheld controller to real-time input received at the handheld controller. Similarly, example implementations relate to punch-out transitions to smoothly transition operation of parts of a robotic system from real-time input to control tracks, such as to smoothly transition from the real-time input received at a handheld controller to a control track rotating a knob at a handheld controller. In particular, an example system may include a handheld haptic controller, a control system, and a robotic component.

20 Claims, 16 Drawing Sheets

(56) References Cited

U.S. PATENT DOCUMENTS

| | | |
|---|---|---|
| 2002/0036622 A1 | 3/2002 | Jaeger |
| 2004/0257339 A1 | 12/2004 | Takahashi |
| 2007/0236450 A1 | 10/2007 | Colgate et al. |
| 2009/0009491 A1 | 1/2009 | Grivna |
| 2012/0019999 A1* | 1/2012 | Yao Shao ........... G06F 3/03547 361/679.3 |
| 2012/0294696 A1* | 11/2012 | Summer ................ B25J 9/1689 414/1 |
| 2014/0132082 A1 | 5/2014 | McGinn et al. |
| 2014/0135991 A1 | 5/2014 | Summer et al. |
| 2014/0163730 A1 | 6/2014 | Mian |
| 2016/0089212 A1 | 3/2016 | Balicki et al. |

OTHER PUBLICATIONS

Kickstarter, "SPIN remote—The Simplest, most Stylish remote ever", Dec. 2, 2014, <https://www.kickstarter.com/projects/spinremotelspin-remote-the-simplest-most-personal-remote-ever>.

* cited by examiner

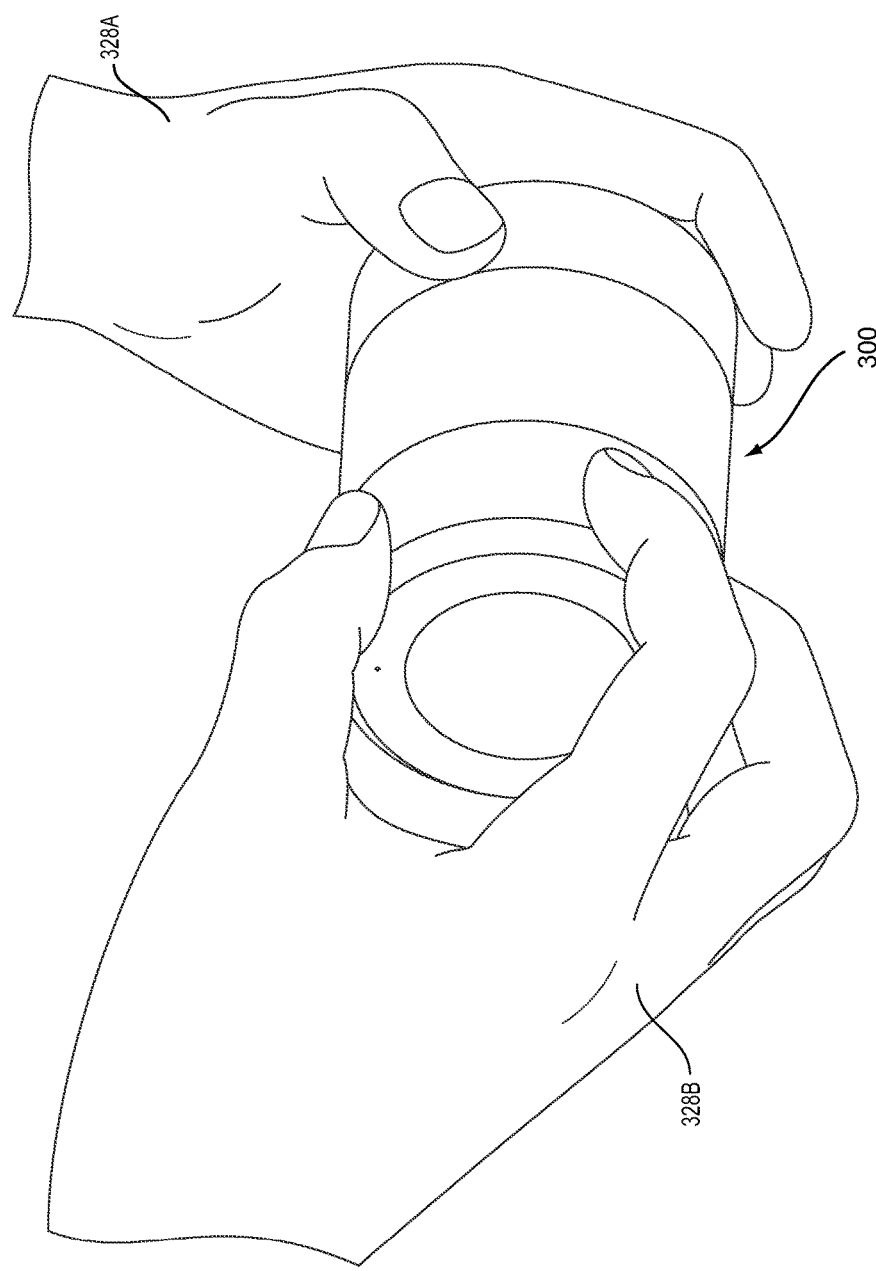

PUNCH-IN / PUNCH-OUT SMOOTHING FOR TAKEOVER OF AUTOMATED MOVEMENT WITH HAPTIC CONTROLLER

BACKGROUND

Robotic systems may be used for applications involving material handling, welding, assembly, and dispensing, among others. Over time, the manner in which these robotic systems operate is becoming more intelligent, more efficient, and more intuitive. As robotic systems become increasingly prevalent in numerous aspects of modern life, the need for robotic systems capable of working alongside humans becomes apparent. Therefore, a demand for such robotic systems has helped open up a field of innovation in controllers, sensing techniques, as well as component design and assembly.

SUMMARY

Example implementations may relate to punch-in and punch-out transitions of parts of a robotic system, such as a handheld controller and a robotic component.

In one aspect, a system is provided. The system includes a handheld controller. The handheld controller includes a rotatable knob coupled to a base, at least one motor that is operable to apply a torque-generating force to the rotatable knob, and a curved touchpad arranged to sense tactile data on a curved surface of the rotatable knob. The system includes a control system configured to output robot control signals based on playback of at least one pre-defined robot control track on a robotic system component, generate a handheld controller control signal corresponding to the at least one pre-defined robot control track, where the handheld controller control signal indicates torque to be applied to the rotatable knob over time, detect touch input received from the handheld controller, and, in response to receiving the touch input, transition operation of the handheld controller from the handheld controller control signal to real-time input received from the handheld controller.

In a further aspect, another system is provided. The system includes a handheld controller. The handheld controller includes a rotatable knob coupled to a base, at least one motor that is operable to apply a torque-generating force to the rotatable knob, and a curved touchpad arranged to sense tactile data on a curved surface of the rotatable knob. The system includes a control system configured to store one or more transition options, wherein the one or more transition options correspond to pre-programmed takeover transitions or pre-programmed release transitions, and wherein the one or more transition options are based at least in part on corresponding expected takeover proximity data or expected release proximity data. The control system is configured to generate a handheld controller control signal corresponding to at least one pre-defined robot control track, where the handheld control signal indicates torque to be applied to the rotatable knob over time. The control system is further configured to detect proximity data received from the one or more proximity sensors, compare received proximity data to expected takeover proximity data, and, when received proximity data matches expected takeover proximity data, transition operation of the handheld controller, based at least in part on the one or more transition options, from the handheld controller control signal to real-time input received from the handheld controller.

In another aspect, a method is provided. The method includes outputting robot control signals based on playback of at least one pre-defined robot control track on a robotic system component. The method includes generating a handheld controller control signal corresponding to the at least one pre-defined robot control track. The handheld controller includes a rotatable knob coupled to a base, at least one motor that is operable to apply a torque-generating force to the rotatable knob, and a curved touchpad arranged to sense touch input on a curved surface of the rotatable knob. The handheld controller control signal indicates torque to be applied to the rotatable knob over time. The method includes detecting first touch input on the handheld controller, and, in response to detecting the first touch input, transitioning operation of the handheld controller from handheld controller control signal to real-time input received from the handheld controller.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIGS. 3A, 3B, 3C, and 3D illustrate an example handheld controller, according to an example implementation.

DETAILED DESCRIPTION

Figure 1A:
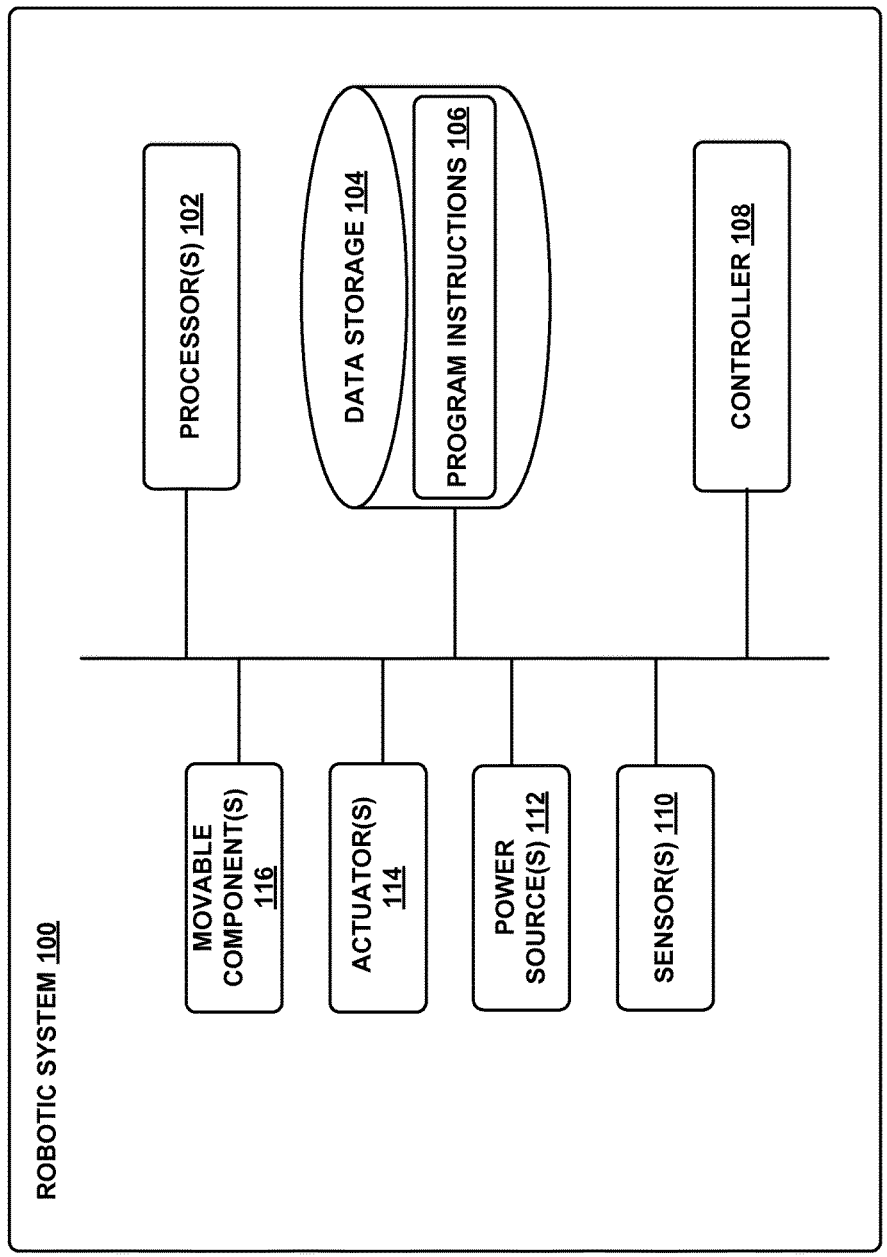
FIGS. 1A and 1B illustrate an example robotic system, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

According to various implementations, described herein are methods and systems for a smooth takeover of automated movement with a haptic controller. In this application, a "punch-in" refers to a takeover transition (e.g., a transition from a pre-recorded control track to control based on real-time input via from the handheld controller), and a "punch-out" refers to a release transition (e.g., a transition from control based on real-time input provided via the handheld controller back to the pre-recorded control track). To avoid equipment damage and increase intuitive control of the system, transition options may be used to help smoothly provide punch-in and punch-out in a robot control system environment.

An example handheld controller may be utilized to manipulate data input to a robotic device, e.g., via a computing device. Further, an example system may include a (i) haptic handheld controller, (ii) a control system, and (iii) a robotic system. In an example embodiment, pre-programmed robot control tracks may be recorded, saved, and/or played. The pre-programmed robot control tracks each include signals that indicate certain robot movement or function. "Playing" one or more of such tracks may therefore cause the robot to move in accordance with the signals making up the robot control tracks. In this scenario, a handheld haptic controller may be following one or more aspects of the tracks (e.g., a rotatable knob may be rotating as an indication of the function of the robot control track) while the track is being played. In other words, the handheld controller and the robotic system may, in some situations, play robot control tracks concurrently.

In an example embodiment, a haptic controller includes a motorized knob. The knob includes a motor that can apply a torque-generating force to the knob, and thus can provide force feedback via the knob, can rotate the knob autonomously, and/or can vary the amount of force a user must apply to rotate the knob. Configured as such, an example controller may vary the torque that is applied to the knob so as to simulate what manipulation of different types of data "feels" like. Further, the haptic controller can includes touch sensors coupled to or integrated in the rotatable knob. For instance, in an example configuration the full surface (e.g., the full, curved cylindrical or conical surface) of the knob may be a touch-sensitive surface. As such, rotation of knob and touch data received from the touch sensors may collectively generate handheld controller output data (i.e., computing device input data) that represents intended control actions provided by a user holding the handheld controller.

II. Examples Systems for Control of Robotic Devices

Referring now to the figures, FIG. 1A shows an example configuration of a robotic system 100. Robotic system 100 may be any device that has a computing ability and interacts with its surroundings with an actuation capability and/or with ability to emit/generate physical phenomena such as light and/or sound, among others. For instance, the robotic system 100 may be a robotic arm, a humanoid robot, or a quadruped robot, among others. In other examples, robotic system 100 may define a vehicle, a watch, a washing machine, actuated blinds, a conveyer belt, a speaker, or a light bulb, among many other examples. Additionally, the robotic system 100 may also be referred to as a robotic device, a robotic manipulator, or a robot, among others.

The robotic system 100 is shown to include processor(s) 102, data storage 104, program instructions 106, controller 108, sensor(s) 110, power source(s) 112, actuator(s) 114, and movable component(s) 116. Note that the robotic system 100 is shown for illustration purposes only and robotic system 100 may include additional components and/or have one or more components removed without departing from the scope of the disclosure. Further, note that the various components of robotic system 100 may be arranged and connected in any manner.

Processor(s) 102 may be a general-purpose processor or a special purpose processor (e.g., digital signal processors, application specific integrated circuits, etc.). The processor(s) 102 can be configured to execute computer-readable program instructions 106 that are stored in the data storage 104 and are executable to provide the functionality of the robotic system 100 described herein. For instance, the program instructions 106 may be executable to provide functionality of controller 108, where the controller 108 may be configured to instruct an actuator 114 to cause movement of one or more movable component(s) 116.

The data storage 104 may include or take the form of one or more computer-readable storage media that can be read or accessed by processor(s) 102. The one or more computer-readable storage media can include volatile and/or non-volatile storage components, such as optical, magnetic, organic or other memory or disc storage, which can be integrated in whole or in part with processor(s) 102. In some implementations, the data storage 104 can be implemented using a single physical device (e.g., one optical, magnetic, organic or other memory or disc storage unit), while in other implementations, the data storage 104 can be implemented using two or more physical devices. Further, in addition to the computer-readable program instructions 106, the data storage 104 may include additional data such as diagnostic data, among other possibilities.

The robotic system 100 may include one or more sensor(s) 110 such as force sensors, proximity sensors, load sensors, position sensors, touch sensors, depth sensors, ultrasonic range sensors, infrared sensors, Global Positioning System (GPS) receivers, sonar, optical sensors, biosensors, Radio Frequency identification (RFID) sensors, Near Field Communication (NFC) sensors, wireless sensors, compasses, smoke sensors, light sensors, radio sensors, microphones, speakers, radar, cameras (e.g., color cameras, grayscale cameras, and/or infrared cameras), depth sensors (e.g., Red Green Blue plus Depth (RGB-D), lasers, structured-light, and/or a time-of-flight camera), motion sensors (e.g., gyroscope, accelerometer, inertial measurement unit (IMU), and/or foot step or wheel odometry), and/or range sensors (e.g., ultrasonic and/or infrared), among others. The sensor(s) 110 may provide sensor data to the processor(s) 102 to allow for appropriate interaction of the robotic system 100 with the environment. Additionally, the robotic system 100 may also include one or more power source(s) 112 configured to supply power to various components of the robotic system 100. Any type of power source may be used such as, for example, a gasoline engine or a battery.

The robotic system 100 may also include one or more actuator(s) 114. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, or electricity, among other possibilities. In some cases, an actuator may be a rotary actuator that may be used in systems involving rotational forms of motion (e.g., a joint in robotic system 100). In other cases, an actuator may be a linear actuator that may be used in systems involving straight line motion. In either case, actuator(s) 114 may cause movement of various movable component(s) 116 of the robotic system 100. The moveable component(s) 116 may include appendages such as robotic arms, legs, and/or hands, among others. The moveable component(s) 116 may also include a movable base, wheels, and/or end effectors, among others.

The above description of processor(s) 102, data storage 104, program instructions 106, sensor(s) 110, and power source(s) 112 may apply to any discussion below relating to the respective component being used in another system or arrangements. For instance, FIGS. 2A and 3A (among other possible figures) illustrate processors, data storage, program instructions, sensors, and/or power sources as being incorporated in other arrangement. These components at issue may thus take on the same or similar characteristics (and/or form) as the respective components discussed above in association with FIG. 1A. However, the components at issue could also take on other characteristics (and/or form) without departing from the scope of the disclosure.

Figure 1B:
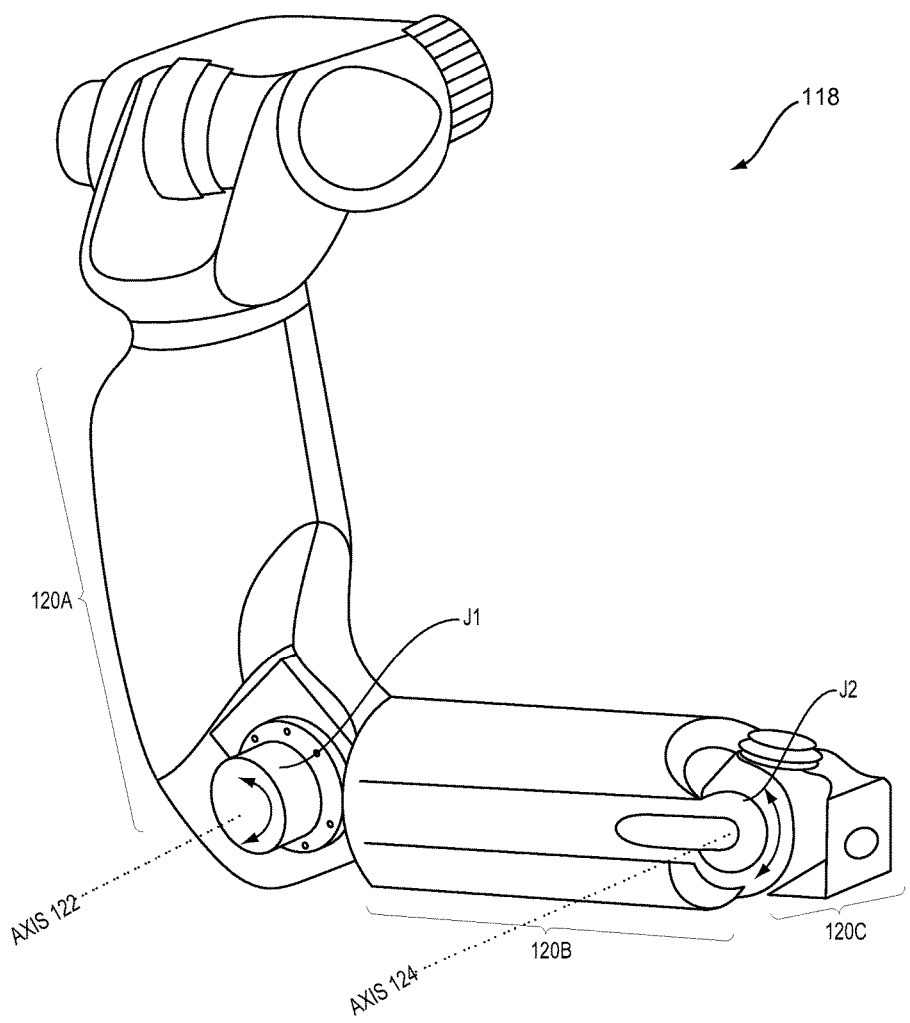

A robotic system 100 may take on various forms. To illustrate, refer to FIG. 1B showing an example robotic arm 118. As shown, the robotic arm 118 includes movable component(s) 116 such as appendages 120A, 120B, and 120C, among others. Additionally, the robotic arm 118 includes joints J1 and J2, each coupled to one or more actuators (not shown) such as actuator(s) 114. The actuators in joints J1 and J2 may operate to cause movement of various movable component(s) 116 such as appendages 120A, 120B, and 120C. For example, the actuator in joint J1 may cause movement of appendage 120B about axis 122 (e.g., resulting in rotation about an axis of joint J1). Whereas, the actuator in joint J2 may cause movement of appendage 120C about axis 124 (e.g., resulting in rotation about an axis of joint J2). Other examples may also be possible.

Figure 2A:
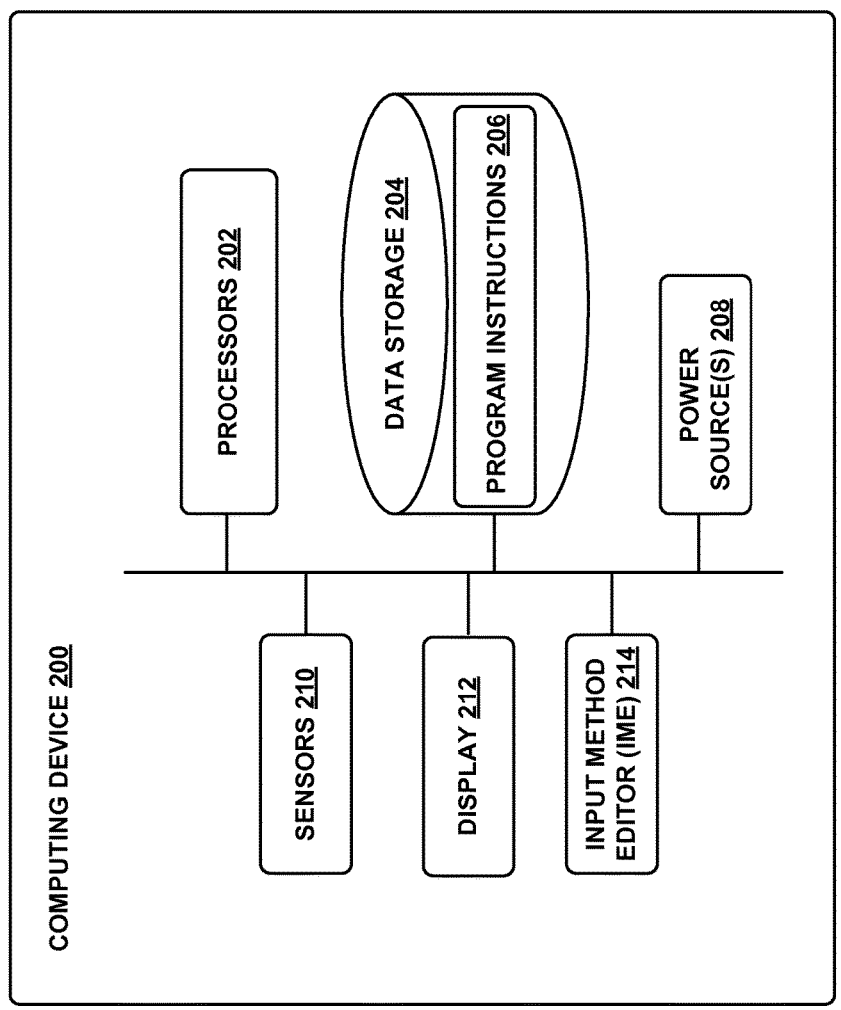
FIGS. 2A and 2B illustrate an example computing device, according to an example implementation.

FIG. 2A is a block diagram showing components of an example computing device 200 that includes one or more processors 202, data storage 204, program instructions 206, power source(s) 208, sensors 210, display 212, and Input Method Editor (IME) 214. Note that the computing device 200 is shown for illustration purposes only and computing device 200 may include additional components and/or have one or more components removed without departing from the scope of the disclosure. Further, note that the various components of computing device 200 may be arranged and connected in any manner.

Display 212 may take on any form (e.g., LED, LCD, OLED, etc.). Further, display 212 may be a touchscreen display (e.g., a touchscreen display on a tablet). Display 212 may show a graphical user interface (GUI) that may provide an application through which the user may interact with the systems disclosed herein.

Further, the computing device 200 may receive user input (e.g., from the user of the computing device 200) via IME 214. In particular, the IME 214 may allow for interaction with the GUI such as for scrolling, providing text, and/or selecting various features of the application, among other possible interactions. The IME 214 may take on various forms. In one example, the IME 214 may be a pointing device such as a computing mouse used for control of the GUI. However, if display 212 is a touch screen display, user touch input can be received (e.g., such as using a finger or a stylus) that allows for control of the GUI. In another example, IME 214 may be a text IME such as a keyboard that provides for selection of numbers, characters and/or symbols to be displayed via the GUI. For instance, in the arrangement where display 212 is a touch screen display, portions of the display 212 may show the IME 214. Thus, touch-input on the portion of the display 212 including the IME 214 may result in user-input such as selection of specific numbers, characters, and/or symbols to be shown on the GUI via display 212. In yet another example, the IME 214 may be a voice IME that may be used that receives audio input, such as from a user via a microphone of the computing device 200, that is then interpretable using one of various speech recognition techniques into one or more characters than may be shown via display 212. Other examples may also be possible.

Figure 2B:
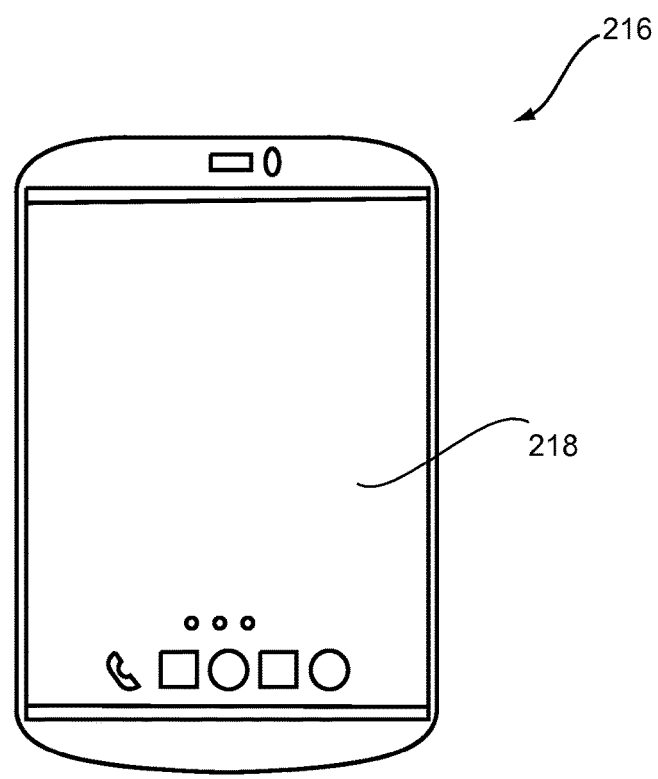

A computing device 200 may take on various forms. For instance, the computing device 200 may take the form of a desktop computer, a laptop, a tablet, a wearable computing device, and/or a mobile phone, among other possibilities. To illustrate, refer to FIG. 2B showing an example tablet 216. As shown, the tablet 216 includes touch-screen display 218 that is configured to display a GUI and receive user-input such as by way of one or more touch gestures provided by a user of the tablet 216. Note that the tablet may also include other components not shown and described herein.

Figure 3A:
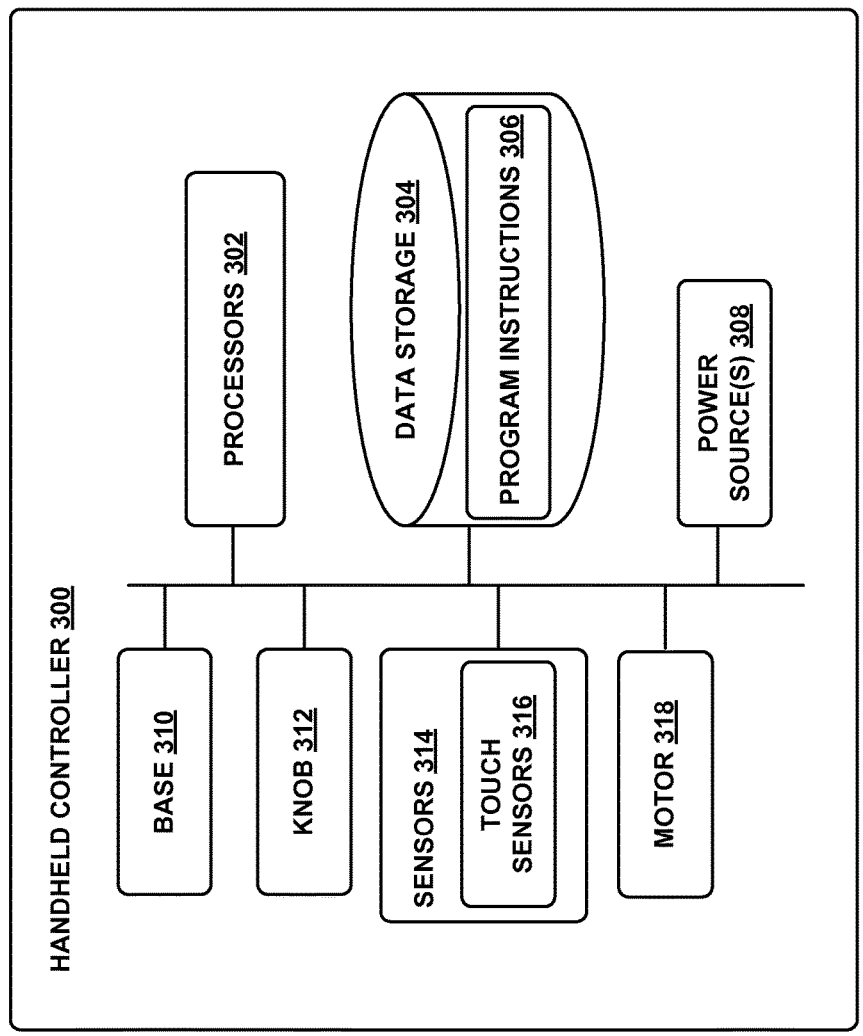
Figure 3B:
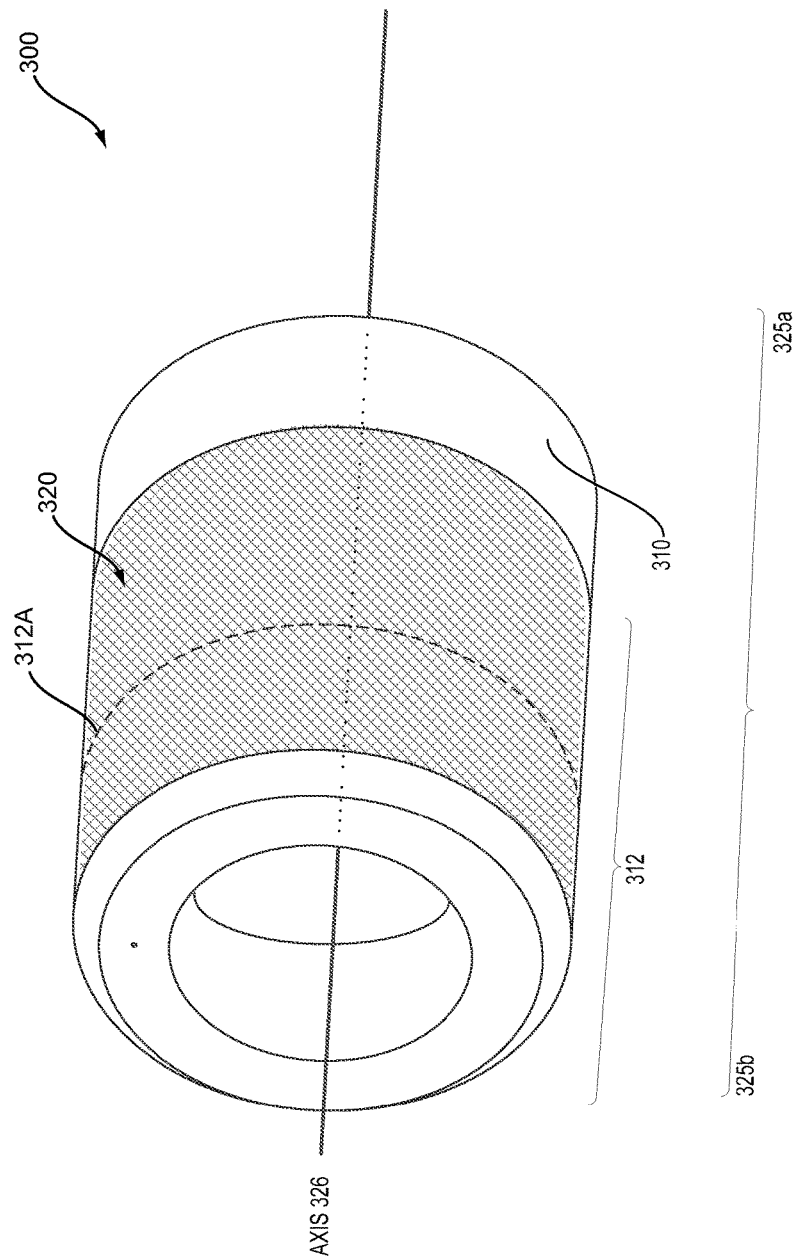

FIG. 3A is a block diagram showing functional components of a haptic hand-holdable controller 300, according to an example implementation. FIG. 3B is an illustration showing one possible implementation of a hand-holdable controller 300, which may include some or all of the components shown in FIG. 3A. A haptic hand-holdable controller 300 may also be referred to herein as a hand-holdable controller, a hand-holdable-controller system, a controller system, a wireless controller, or simply as a controller. In an example implementation, the components shown in FIG. 3A may be part of a hand-holdable controller with a motorized knob, which can also receive input via a curved touchpad on its outer surface. Other implementations, which utilize other components, are also possible.

In FIG. 3A, the hand-holdable controller 300 is shown to include one or more processors 302, data storage 304, program instructions 306, power source(s) 308, a base 310, a knob 312, sensors 314 such as touch sensors 316, and a motor 318. Note that the hand-holdable controller 300 is shown for illustration purposes only and hand-holdable controller 300 may include additional components and/or have one or more components removed without departing from the scope of the disclosure. Further, note that the various components of hand-holdable controller 300 may be arranged and connected in any manner.

Base 310 may be arranged so as to allow a user to grasp onto (e.g., hold) the hand-holdable controller 300 with one hand, while rotating the knob 312 with their other hand. Such a base 310 may be any shape, size, and/or form. Additionally or alternatively, the base 310 may be arranged to be positioned on and/or coupled to a surface or a robot joint (or another entity). With this arrangement, the user would not necessarily have to grasp onto the base 310 (e.g., so as to hold the controller 300) and could thus rotate the knob 312 with the controller 300 essentially positioned on and/or coupled to the entity. In a further aspect, this base 310 may be coupled to one or more other components of the hand-holdable controller 300, and/or may be integrated as part of a controller housing (e.g., that extends into a center cavity in the knob 312 such that the knob 312 can rotate about the portion of the housing that extends from the base 310).

Rotatable knob 312 can take on various forms, such as the cylindrical form shown in FIG. 3B, or a conical form, among other possibilities. References herein to a "cylindrical" knob or other "cylindrical" components of the controller should be understood to encompass cylindrical, conical and other forms of the knob 312 and/or other component. With such example arrangements, the controller 300 may be thus configured so that a user can provide input to the controller 300 by way of rotating the knob 312 about (e.g., relative to) the base 310. For example, the degree and/or speed of rotation of the knob 312 may provide input for control of, e.g., a robotic device.

Further, the hand-holdable controller 300 may include one or more sensors 314 such as any of the example sensors discussed above in the context of the sensor(s) 110 of robotic system 100. For instance, the hand-holdable controller 300 may include touch sensors 316 such as capacitive sensors, for example. The touch sensors 316 may be positioned and/or integrated within the knob 312 and/or within other components of the hand-holdable controller 300. For instance, the touch sensors 316 may be arranged to detect touch on one or more surfaces of the knob 312. To do so, the touch sensors 316 could, for example, take the form of a curved touchpad arranged along at least a portion of the one or more surfaces. With such example arrangements, touch data received via these touch sensors 316, such as during rotation of the knob 312, may be used to control various aspects of the robotic system 100 (e.g., via the computing device 200) and/or various aspects of the computing device 200 as further discussed below.

In an example implementation, such as that shown in FIG. 3B, the hand-holdable controller 300 may rotate about a central axis 326, and the touch sensors may be arranged to provide a curved touchpad 320, which may also be referred to as a cylindrical touch surface. In FIG. 3B, the cylindrical touch surface 320 is indicated by the crosshatch pattern on the surface of the knob 312. Further, in some implementations, the cylindrical touch surface 320 can extend around the entire outer surface of the knob (or portions thereof), such that the touch surface is a full cylinder (e.g., with no gaps in touch sensing anywhere in the circumference of the knob 312).

The hand-holdable controller 300 may additionally or alternatively include other tactile sensors as well. For example, hand-holdable controller 300 may include any sensor that generates information arising from physical interaction with the environment of the hand-holdable controller 300, such as capacitive sensors, positional feedback sensors, pressure sensors, proximity sensors, strain gauges, force sensors, temperature sensors, magnetic sensors, or others. For example, the hand-holdable controller 300 may include a proximity sensor (e.g., a Hall-effect sensor or an infrared sensor) to detect the presence of objects near the hand-holdable controller 300 but that are not in contact with the hand-holdable controller 300.

In some implementations, the hand-holdable controller 300 may not include any mechanical or structural interface features (e.g., mechanical buttons, switches, jacks, connectors, or controls), other than the knob 312. In such an implementation, the rotation of the knob 312 and tactile or touch input may be the only forms of user input that are possible via the controller 300. Alternatively, the hand-holdable controller 300 may include other interface features (not shown in the Figures) in addition to the knob 312. For example, the hand-holdable controller 300 may include a power switch or button, or other buttons, switches, jacks, connectors, or controls for providing input via the hand-holdable controller 300.

In an example implementation, the hand-holdable controller 300 may include at least one motor 318 that is operable to apply a torque-generating force to knob 312. The motor 318 may be a brushed DC motor, a brushless DC motor, or an AC motor such as a synchronous electric motor or an induction motor, among other possibilities. Additionally, the motor 318 may include a motor shaft, a stationary stator, and a rotor coupled to the motor shaft such that the motor shaft is configured to deliver mechanical power to, for instance, a transmission assembly, thereby causing a rotation of the transmission assembly (which may be coupled to knob 312).

More specifically, the shaft of motor 318 may operably connected to the knob 312 and/or to a control component, such that the control component can receive an electrical input signal to control the rotation of the shaft (and thus the knob 312 as well). Alternatively, the knob 312 may be connected directly to the control component (e.g., not by way of a shaft), among other possible arrangements. For example, a slip ring or rotary transformer may be used to couple electrical signals between two parts that rotate in relation to each other, and thereby to power the rotatable portion of the hand-holdable controller 300 (e.g., to rotate the knob 312).

In a further aspect, the hand-holdable controller 300 may also include (i) potentiometers and/or variable capacitors that could be used for applications such as determining a rotary position of the knob 312 as the knob 312 rotates due to torque from the motor 318 and/or due to an external torque and/or (ii) a rotary switch that could be used to change configuration (e.g., power on or off) of the controller 300 in accordance with rotation of the knob 312 due to torque from the motor 318 and/or due to an external torque, among other components.

With the above example arrangement, the at least one motor 318 is controllable in order to vary the amount, and possibly the direction, of the torque that is applied to the knob 312. In particular, motor 318 may be operable to affect and/or resist rotation of the knob 312. For instance, the motor 318 may provide haptic feedback and/or change the "feel" of the knob 312 by applying torque to the knob in a clockwise or counter-clockwise direction. By way of example, the motor may be operable to, e.g., make rotation of the knob 312 by the user more or less difficult, to back drive a hand of a user holding the knob by way of rotational feedback, to rotate the knob 312 without additional torque being applied by a user, to replicate the feel of detents or clicks during the rotation of the knob, and/or to provide vibrational feedback, among other possibilities.

In a specific example, the controller 300 may control a joint of robotic system 100 (e.g., via computing device 200 as discussed below). In this example, the motor 318 could resist (or back drive) rotation of the knob 312 in response to a determination (e.g., by the computing device 200) that a moveable component coupled to the joint is entering a non-permissible zone (e.g., unsafe zone), such as within a threshold distance of a human for instance. Other examples are also possible.

As noted above, FIG. 3B shows an example implementation of a hand-holdable controller 300. As shown, the example hand-holdable controller 300 includes a base 310, a knob 312, and a motor (not shown) as well as any of the components discussed above in the context of hand-holdable controller 300. The controller 300 may have a proximate end 325a that is near the base 310 (illustrated in FIG. 3B near the bottom of the base 310) and a distal end 325b (illustrated in FIG. 3B near the top of the knob 312). The knob 312 may rotate or be rotated clockwise and/or counterclockwise about axis 326 in order to control a robotic system or a component thereof in various ways.

Further, touch data (or tactile data) may be received, during the rotation of the knob 312 or while the knob 312 is stationary, from one or more sensors (e.g., touch sensors 316 or tactile sensors) positioned on one or more surfaces of the knob 312. This touch data may affect the manner the robotic system 100 is being controlled. To illustrate, refer to example FIGS. 3C-3D showing different hand positions on the example hand-holdable controller 300.

Figure 3C:
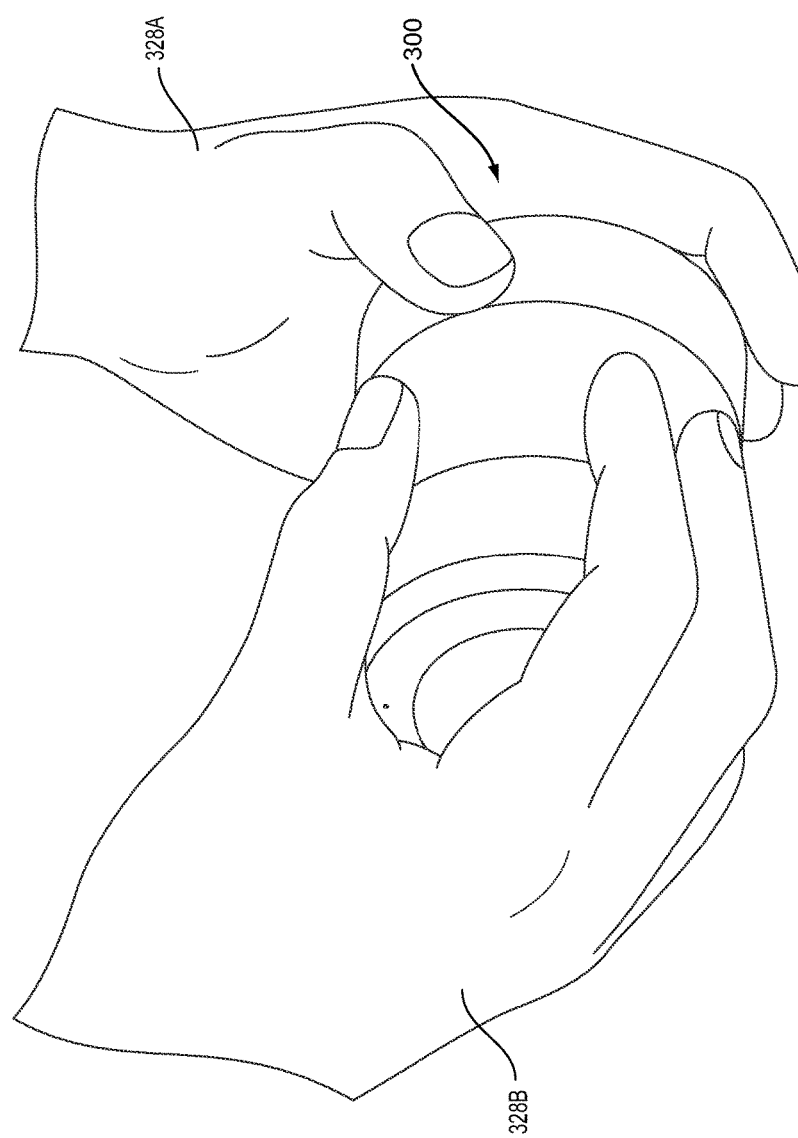

FIG. 3C shows a hand 328A of a user grasping onto the base 310 of the hand-holdable controller 300 such as for the purpose of holding onto the hand-holdable controller 300. Whereas, the other hand 328B of the user grasps onto the knob 312 such as for the purpose of providing user-input by rotation and/or touch of the knob 312. As shown, the hand 328B grasps onto a relatively large surface area of the knob 312 such as by several fingers as well as the palm on the surface area of the knob 312. The touch sensors may detect this particular touch gesture (e.g., this touch gesture may be referred to as a "full grip" or "full grasp") by the user and may provide corresponding touch data representing this particular touch gesture.

In contrast, FIG. 3D shows the hand 328A of the user grasping onto the base 310 in the same manner as in FIG. 3C. However, in this case, the other hand 328B of the user grasps onto a relatively small surface area of the knob 312 such as by placing only fingertips on the surface area of the knob 312 close to the distal end 325b. The touch sensors may detect this different particular touch gesture (e.g., this touch gesture may be referred to as a "fingertip grip" or "fingertip grasp") by the user and may provide different corresponding touch data representing this different particular touch gesture. As such, the touch illustrated in FIG. 3D may result in different control functionality of the robotic system 100 (and/or the computing device 200) than the touch illustrated in FIG. 3C. Moreover, different touch gestures may result in different control functionality even if the characteristics of the rotation of the knob 312 (e.g., amount and/or speed of rotation) are the same across different touch gestures and/or even if the component being controlled is the same across different touch gestures.

Many other example touch gestures (e.g., actions which may generate touch data, such as gestures, grips, grasps, touches, and/or other tactile information) may also be possible without departing from the scope of the disclosure. For example, the hand 328A of the user may grasp onto base 310 in the same manner as in FIGS. 3C and 3D. However, other touch gestures may include one or more of (i) a palming, (ii) a partial grip (with finger extension or retraction), (iii) a multi-finger sequence, (iv) a multi-touch, (v) a drag, (vi) a side surface hold, (vii) a side surface swipe, (viii) a fingertip only, (ix) a single tap (possibly at a certain location or within a certain area on the surface of the knob), (x) a double tap (possibly at a certain location or within a certain area on the surface of the knob), and/or (xi) a swipe or swipe pattern (possibly at a certain location or within a certain area on the surface of the knob), among other possibilities.

As one specific example, a palming grip may entail the palm of hand 328B to be placed on the top of the knob 312 (e.g., at the top of the proximate end 325a of hand-holdable controller 300). For example, an intuitive use of the palming grip may be as an indication of a stop command. Thus, the hand-holdable controller 300 may interpret touch data indicative of a palming and issue a stop command to the computing device 200 or robotic system 100 (or the hand-holdable controller 300 may send the palming touch data to the computing device 200, which in turn sends a command to stop the robotic system 100 from performing an action or to stop an action that the robotic system 100 is currently performing).

In another example of touch input, a partial grip may be interpreted from touch data that indicates a touch gesture somewhere between the grips illustrated in FIGS. 3C and 3D. For example, similar to the full grip show in FIG. 3C, all five fingers of hand 328B of the user may be used to grasp the hand-holdable controller 300 but, for the partial grip, those fingers may be placed closer to the distal end 325b (e.g., above the dividing line 312A of the knob 312 illustrated in FIG. 3B). In the partial grip (although applicable to other grips as well), touch input related to a finger retraction or finger extension may be used to generate touch data. For example, sensors (such as touch sensors 316) may detect a finger retraction (e.g., one or more fingers of hand 328B sliding or moving towards the distal end 325b of hand-holdable controller 300) or a finger extension (e.g., one or more fingers of hand 328B sliding or moving towards the proximate end 325a of hand-holdable controller 300). This finger retraction or extension may vary the commands sent to the robotic system 100. For example, a partial grip plus a finger extension may send control signals of increased magnitude as the fingers extend further. Likewise, a partial grip plus a finger retraction may send control signals of decreased magnitude as the fingers retract further. Other example touch gestures are possible and may be programmable (e.g., via IME 214 or other hardware or software).

Alternatively, a partial grip may be defined in other ways. For example, a partial grip may be defined as a full grip minus one or more pieces of touch input (e.g., touch input indicative of five (or less) fingers with no touch input indicative of a palm on top of knob 324).

In another example of touch input, a finger sequence may be used. For example, touch input indicative of the fingers of hand 328A being placed in a certain sequence may be used to generate touch data. For example, placing the five fingers down in a pattern may be identified and used. For example, a touch input indicative of the user touching the knob 324 first with the thumb and then subsequently with each finger of hand 328a may be used to power the device on or off, or accomplish any other functions. Likewise, any other finger sequence could be identified and used. For example, touch input indicative of a single finger tap (or thumb tap or palm tap) on any touch-sensitive surface could be used. Likewise, touch input related to a swipe could be used. For example, an index finger of hand 328B may be placed on top of knob 324 and swiped in a pattern (e.g., a clockwise pattern) to generate touch data.

Touch gestures can be used in combination to vary the control signals sent to the robotic system 100. For example, a full grip being performed simultaneously with a rotation of the knob 312 may actuate a joint at a high speed. By adding in a touch gesture (e.g., a fingertap) to the full grip and rotation, the control signal may be varied. For example, the speed or magnitude of the control signal may be varied. Similarly, a different component may be controlled by the additional touch gesture (e.g., the fingertap may generate a control signal to close a gripper).

Other examples of touch input that may be used to generate touch data include, for example, a multi-touch (e.g., a combination of touches, such as a full grip followed by a palming, a drag (e.g., an identified grip followed by a dragging motion), a side surface hold (e.g., two fingers of hand 328B placed and held alongside knob 312), and a side surface swipe (e.g., two fingers of hand 328B placed alongside knob 312 and swiped in a clockwise manner). Of course, many other examples of touch input are possible. Also, note that feedback (e.g., vibrational feedback, clicks, and detents) could be provided by the controller 300 in response to transitions between such touch inputs.

Figure 4:
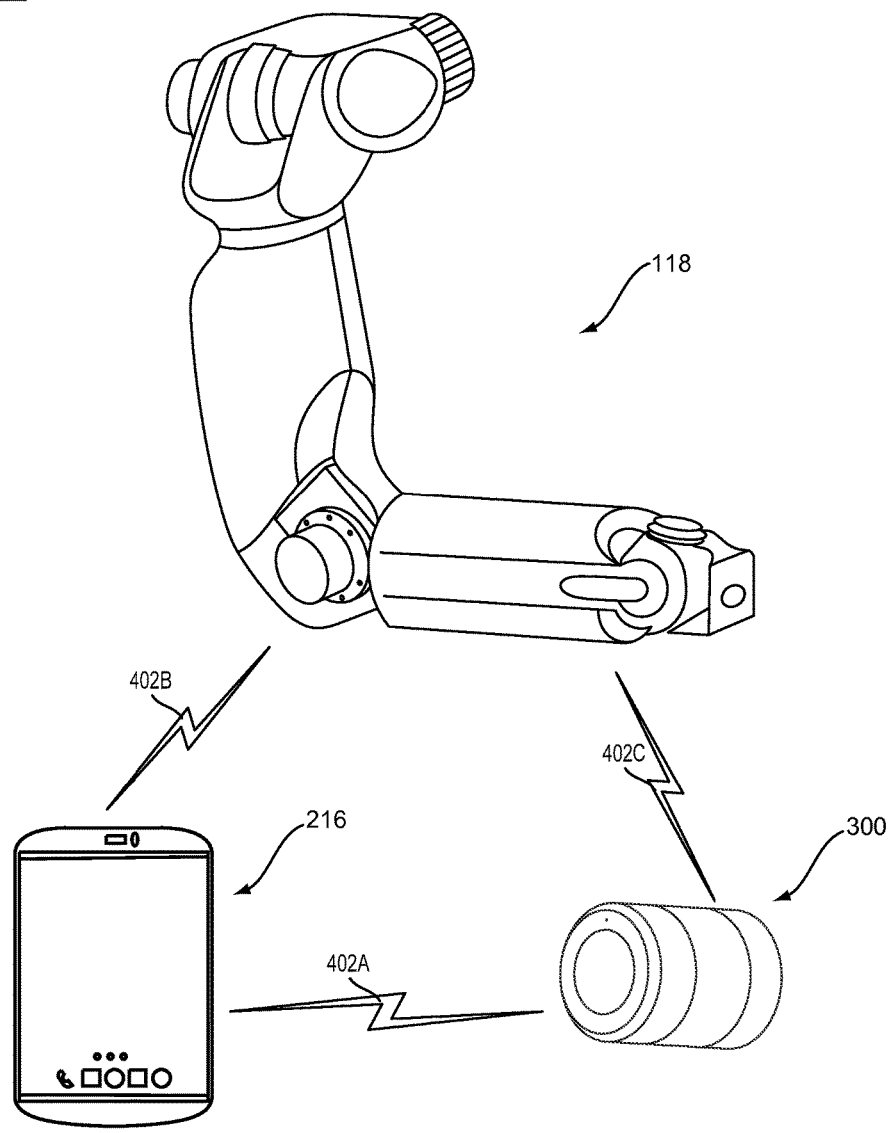
FIG. 4 illustrates example communication links, according to an example implementation.

Robotic system 100, computing device 200, and/or hand-holdable controller 300 may communicate with each other in various ways. To illustrate, refer to FIG. 4 showing an example arrangement 400 including communication links 402A, 402B, and 402C that provide for exchange of information between the various systems. For instance, communication link 402A provides for communication between example hand-holdable controller 320 and tablet 216, communication link 402B provides for communication between tablet 216 and robotic arm 118, and communication link 402C provides for communication between robotic arm 118 and example hand-holdable controller 320. Note that other arrangements may also be possible as some communication links may be removed and other communication links may be added such as for communication with other devices not discussed herein.

Communication links 402A, 402B, and 402C may include wired links and/or wireless links (e.g., using various wireless transmitters and receivers). A wired link may include, for example, a parallel bus or a serial bus such as a Universal Serial Bus (USB). A wireless link may include, for example, Bluetooth, NFC, IEEE 802.11(IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11).

In other examples, the arrangement may include access points through which the various systems may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

In an example implementation, the hand-holdable controller 300 may be configured to receive instructions (e.g., from computing device 200) indicating an operational mode for the hand-holdable controller 300 (e.g., for the rotatable knob 312), so as to essentially load the operational mode onto the controller 300. Such an operational mode may define operational parameters of the motor (e.g., motor 318) of the hand-holdable controller 300. As such, different operational modes may provide different "feels" to the knob by varying the haptic characteristics of the knob 312. In particular, different "feels" can be provided by varying the torque applied to the knob as it rotates and/or otherwise varying when and how torque is applied to the knob 312 and/or by varying the type (or type of control) of motor 318 (e.g., by using a position rotation motor, a continuous rotation motor, a linear motor, etc.).

For example, a given operational mode may specify a specific amount of turning resistance, or in other words, a specific amount of torque that counters rotation by the user (making it harder or easier for the user to turn the knob). In another example, an operational mode may specify a rotationally-varying torque profile, which varies the amount of resistance to turning as the knob rotates. In some implementations, a positional rotation servomotor may be used where the torque rating of the servomotor at a particular position must be overcome to turn the knob. Other examples are also possible.

In another aspect, a given operational mode may specify a range of rotation to which the knob 312 is restricted. To do so, an operational mode may define the number of degrees of rotation from a base orientation that are permissible in one or two directions. For example, an operational mode may limit rotation to within plus or minus 45 degrees from a center point. Other examples are also possible.

In yet another aspect, a given operational mode may set limits on the speed at which the knob can turn. For instance, a given operational mode may set a maximum or minimum number of degrees per second. Further, in some implementation s, an operational mode may vary the maximum or minimum speed of rotation as a function of the number of degrees the knob has rotated from a base orientation.

In yet another aspect, a given operational mode may indicate whether or not to apply a return-to-center function, which returns the knob to a base orientation when certain conditions are met. For example, a return-to-center function may rotate the knob back to a base orientation whenever input data from the touch sensors on the knob indicates that the user has released the knob. As another example, a return-to-center function may only respond to release of the knob by rotating the knob back to the base orientation in certain orientations of the knob (e.g., when the knob has been rotated by at least some threshold amount from the base orientation, or when the knob has reached a rotation limit).

In yet another aspect, a given operational mode may specify certain orientations or a certain range of rotation during which free spin of the knob should be allowed. In particular, when the knob is put in a free-spin mode, the motor may be disabled such that the knob is allowed to rotate freely about the stator of the motor. An operational mode may also specify certain trigger events that trigger the enabling or disabling of free-spin mode. For example, an operational mode could define a certain touch gesture or gestures that enable and/or disable the free-spin mode. Other examples are also possible.

Other haptic parameters may also be adjusted or set by a given operational mode. For example, the hand-holdable controller may be configured to provide a variable resistance through customizable arc sizes of various sizes. As a specific example, a full (or partial) rotation of the knob could be divided into a variable number of arcs, and each arc could be of various sizes. Each of the variable number of arcs could be defined to have a specific feel (e.g., one or more operational modes, such as resistance levels, speed, detents or no detents, etc.). Other examples are also possible.

In a further aspect, an operational mode may also specify how touch input that is received via a knob controller should be interpreted and/or translated into control signals for a robot system. For example, an operational mode may define one or more touch gestures that are available for use in the operational mode, and how these touch gestures should be interpreted. Various types of touch gestures may be defined and mapped to control functions, depending upon the particular implementation.

In some cases, an operational mode may define one or more touch gestures that can be used to switch from the operational mode to one or more other operational modes. Additionally or alternatively, touch gestures that place a knob controller into a given operational mode may be defined globally, such that the controller can be placed into the given operational mode from any other operational mode. In either case, touch gestures may be used to vary the feel of the knob as it is rotated, and/or to vary manner in which rotation of the knob 312 is interpreted into robot control signals. For instance, control signals sent via rotation of the knob may vary based on different manners in which a user gestures or grasps the knob 312 and/or may vary based on the location of the touch gesture along the one or more surfaces of the knob 312, among other possibilities.

According to an example implementation, the hand-holdable controller 300 may detect a rotation of the control knob (e.g., knob 312), and may indicate that rotation of the knob to the computing device 200. Additionally or alternatively, the hand-holdable controller 300 may provide output data to a controller application running on computing device 200, which is indicative of detected touch data (e.g., during rotation of the knob). As such, the computing device 200 may determine the rotation of the knob 312 and/or touch gestures performed on the knob 312, and may responsively generate corresponding control signals for another device (e.g., robotic system 100) in accordance with the rotation and/or detected touch.

To control a device, such as robotic system 100, the computing device 200 may exchange messages with the robotic system 100 (e.g., via communication link 402B). The messages may include commands that indicate the particular component to which the robotic system 100 should send control signals. The messages may also include commands that indicate the particular operations that should be carried out by the particular component. As discussed, these particular operations are based on an interpretation of the input data received by the computing device 200 from the hand-holdable controller 300.

Although reference is made throughout to a hand-holdable controller, this disclosure is not limited to hand-holdable controllers. For example, the controller 300 could attach to a vertical or horizontal surface (e.g., via a mechanical and/or magnetic attachment system) such as a wall, a support beam, a desk, or any other surface. In another example, the controller 300 could attach directly to a device (or portion of a device) it is controlling, such as a speaker, a robot arm, a lighting system, or another controllable device.

Recording and Playing Control Tracks

In one aspect of the system, example implementations may relate to, include, or take the form of a real-time programming and editing environment for robotic control. An example system may be configured to receive a number of control signals and to save each received signal as a separate control track. An example system may be further configured to generate, or receive, handheld controller signals based at least in part on the robot control tracks. Further, the system may define a grouping of a number of such control tracks (and possibly corresponding handheld controller signals) as an arrangement. The system may further generate a time-based control signal visualization for each robot control track in an arrangement which can then be displayed in a graphical user interface ("GUI"). The arrangement may be generated and/or displayed in real time as corresponding control signals (and/or handheld controller signals) are being received. In an example implementation, the GUI may allow for visual timeline-based editing and testing of control signals.

Further, each control track may be associated with (e.g., mapped to) (i) one or more controllable components of a robot, such as to a motor or any other controllable component (e.g., those discussed in reference to robotic system 100) and/or (ii) correspond to one or more controllable components of a handheld controller, such as a handheld controller signal that indicates motor 318 should apply a torque-generating force to a rotatable knob 312, or control an LED or speaker, or control any other controllable component. As such, an example GUI may include a feature or features that allow for some or all of the control tracks in an arrangement to be output to the robot (and possibly a corresponding handheld controller signal), such that the resulting movements of the robot and handheld controller can be repeated on demand.

In a further aspect, timing data may be generated for each control track in an arrangement. The timing data for a given control track track may indicate the timing of the track with respect to a central timeline for the arrangement. Provided with such timing data, the GUI may present some or all of the control-signal visualizations in a given arrangement in a timeline layout. In the timeline layout, the appearance of each control signal visualization (e.g., the size and/or location) may visually indicate the timing of the corresponding control track with respect to the arrangement's central timeline.

Further, an example GUI may provide features that allow for simple and nuanced editing and testing of robot control signals. In particular, a GUI may provide features that allow a user to send one or more of the control tracks to the respectively associated robot component(s), so that the resulting robot movements can be observed. The GUI may further provide features such that, if the resulting robot movements are not as desired, the user may edit a given track by interacting with and manipulating the corresponding control-signal visualization. By presenting tracks in an intuitive timeline layout, and by allowing a user to visually edit individual tracks in the timeline layout, an example GUI may help to simplify the process of generating repeatable control schemes for complex robot movements.

Figure 5:
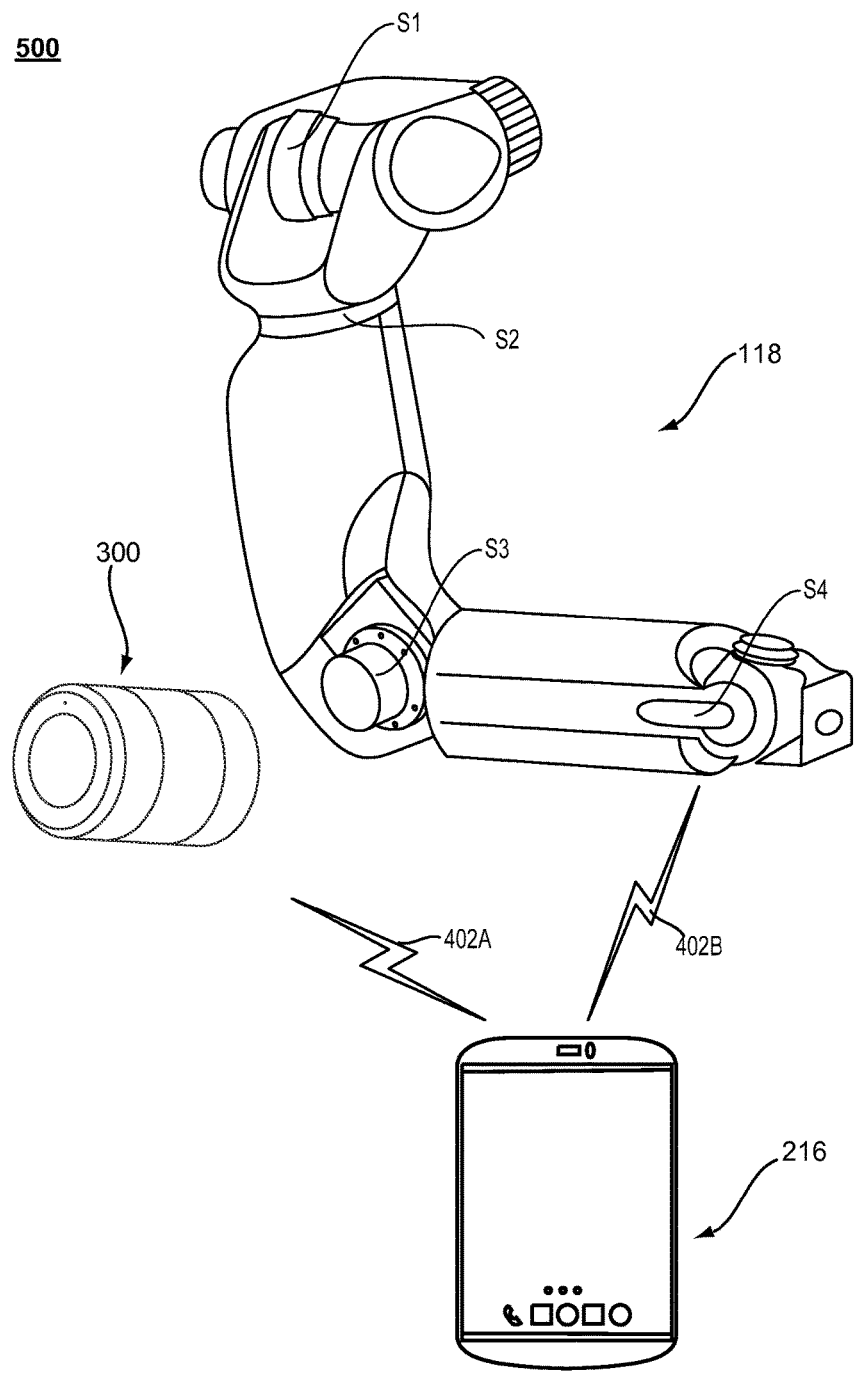
FIG. 5 illustrates a scenario in which an example control track recording and playback system may be implemented.

FIG. 5 illustrates a scenario in which an example control track recording and playback system may be implemented. In particular, FIG. 5 shows an example robotic arm 118, a handheld controller 300, and a tablet 216. As shown, the robotic arm 118 includes sensors S1, S2, S3, and S4. The data signal generated by each sensor may be treated as control signals, which can be used to control robotic arm 118, e.g., the tablet 216 may send a control signal to robotic arm 118 via communication link 402B. The tablet 216 (or a computing device 200 or other control system) may include one or more interfaces that are configured to receive the control signals that are generated by sensors S1 to S4. The tablet 216 may be configured to: (a) generate a separate control track for each received control signal (e.g., such that the tracks are stored in a track database, such as at data storage 204) (b) generate a separate control-signal visualization for each control track, and send such control-signal visualizations for presentation in a GUI on display 218 (c) use saved control tracks and/or received control signals to control the robotic arm 118, and (d) detect user interactions with the GUI that include editing commands, and responsively edit the control tracks. Other examples may also be possible.

The tablet 216 may be further configured to receive, or generate, handheld controller signals. For example, the tablet 216 may receive a transmission (e.g., via communication link 402A) from the robotic arm 118 indicating a robot control track and generate a handheld controller signal corresponding to, or based on, the robot control track. The tablet 216 may receive a transmission (e.g., via communication link 402A) from the handheld controller indicating a handheld controller signal (e.g., a rotation of 180 degrees at a rate of 30 degrees per second or a rotation for at a certain rate for a certain time period). Alternatively, the tablet 216 may detect user interactions with the GUI that include editing commands, and responsively generate the handheld controller signals.

Figure 6:
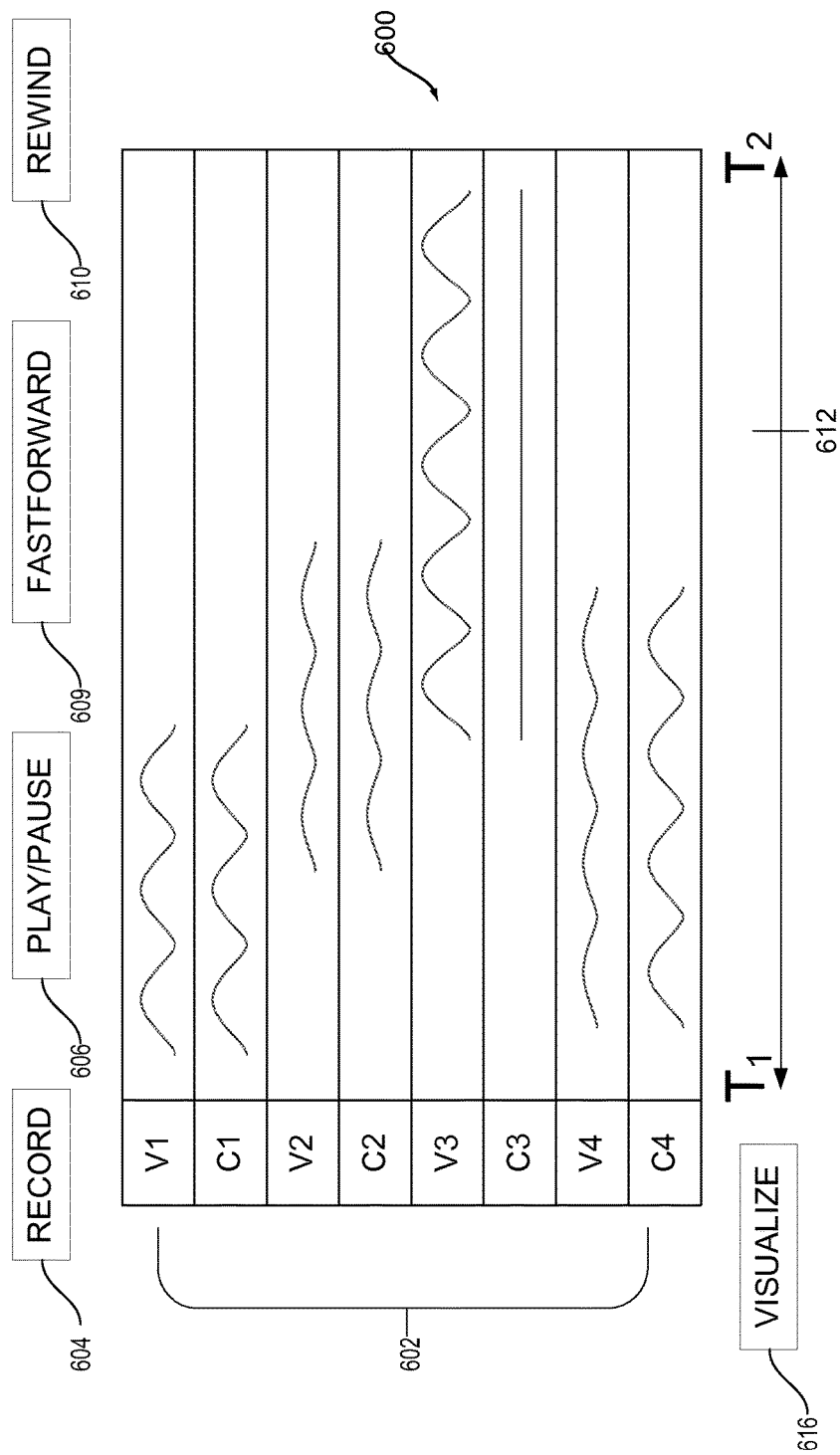
FIG. 6 is an illustration of a GUI 600, according to an example implementation.

FIG. 6 is an illustration of a GUI 600, according to an example implementation. In particular, GUI 600 includes four control signal visualizations V1 to V4 that are arranged in a timeline layout 602. Each control signal visualizations V1 to V4 may correspond to a control signal that was received from one of the sensors S1 to S4 that are shown in FIG. 5. Further, the control tracks corresponding to control signal visualizations V1 to V4 may be included in the same arrangement. As such, GUI 600 also shows a timeline graphic 612, which represents the central timeline for the particular arrangement.

In a further aspect, the GUI may allow a user to select tracks in an arrangement (e.g., by selecting the corresponding visualization or visualizations in the GUI), and send the selected components to the robot (and possibly the handheld controller). When such an instruction is received, a control system (e.g., computing device 200) may responsively send the selected tracks in accordance with the timing that is visually indicated by the timeline layout in the GUI. Such functionality may allow the user to isolate and observe the robotic movement (and the controller movement) produced by a single track, to observe the collective result of a specific subset of control tracks from an arrangement, or to observe the collective result of all the tracks in an arrangement.

Various editing functionality is possible. For example, the GUI 600 may provide time-stretch functionality, which allows a user to increase or decrease the length of a particular track time. For example, the GUI 600 may allow a user to stretch or shrink a given track via interaction with the corresponding control-signal visualizations. Many other editing features are also possible (e.g., version control, outputting to a single file, splicing tracks, cutting and pasting sections of tracks, amplifying or dampening parts of a track, among others).

In a further aspect, when "playing" tracks (e.g., by sending tracks to the appropriate components of the robotic system or handheld controller), a GUI may allow for various controls. For example, a GUI 600 may include a record button 604, which allows a user to record tracks. In particular, a control system may respond to interaction with record button 604 by recording functions (e.g., sensors S1 to S4) at the robot (or handheld controller) and generating control-signal visualizations on the timeline 602. In another example, a GUI 600 may include a play/pause button 606, which allows a user to play or pause the timeline 602 (or the visualization as described further below). In another example, a GUI 600 may include a fast-forward button 608, which allows a user to observe movements at an increased speed. Similarly, a GUI 600 may include a rewind button 610, which allows a user to observe robot movements in reverse. In particular, a control system may respond to an interaction with rewind button 210 by sending tracks that are selected by the GUI in reverse (e.g., moving backwards in time along the central timeline for the arrangement). As another example, a user may be able to "jump" to a particular point in the timeline by, for example, clicking (or touching) one particular time along timeline graphic 612. Note that when this occurs, the control system may need to interpolate robot or handheld controller controls to move the robot or handheld controller from its current position to the position at the chosen time.

In another aspect, a GUI 600 may include a visualize button 616, which allows a user to view a graphic visualization of the robot movement corresponding to selected tracks. For example, when a user interacts with visualize button 616, the control system (e.g., tablet 216) may responsively determine the movement or movements of a robot that are expected to result from which control tracks are selected in the GUI 600. The control system may then generate a 3D rendering showing the determined movement or movements. Therefore, such a visualization feature may allow the user to preview the robot movement resulting from certain control tracks, before testing the control tracks on the actual robot.

In a further aspect, an example system may include a send button 618, which allows a user to send the control signals to the robot (or controller) and generate visualizations in real-time, as the signals are received, such that a user can synchronously see the visualizations of the control signals and observe the movements of the robot (or controller) that results from the control signals.

In an example implementation, a robotic system (e.g., robotic system 100) includes a handheld controller (e.g., handheld controller 300) and a control system (e.g., tablet 216 with processors 202 configured to execute computer-readable program instructions 206 that are stored in data storage 204 and are executable to provide the functionality of the robotic system 100 described herein). The handheld controller 300 includes a rotatable knob coupled to a base, at least one motor that is operable to apply a torque-generating force to the rotatable knob; and a curved touchpad arranged to sense tactile data on a curved surface of the rotatable knob. The control system is configured to perform a punch-in transition. For example, the control system may be configured to (i) play one or more control tracks on the handheld controller and/or a robotic system component, (ii) detect tactile data received from the handheld controller, and (iii) in response to receiving the tactile data, transition operation of the handheld controller and/or the robotic component from the control tracks to real-time input.

In reference to playing control tracks, playing a handheld controller control track may include instructing the motor to apply a torque-generating force to the rotatable knob. Similarly, playing a robotic component control track may include instructing the robotic system to operate a component, e.g., to open or close a gripper or move a joint.

The control system may be further configured to perform a punch-out operation. For example, the control may be configured to detect second tactile data on the handheld controller and, in response to detecting tactile data on the handheld controller, transition operation of the handheld controller and/or robotic component from the real-time input received from the handheld controller to one or more control tracks. Various transitions are possible, for example, the time-varying weighted function as described in reference to FIG. 8, and the pre-programmed takeover options as described in reference to FIG. 9. As noted above, tactile data may include data related to interactions with the handheld controller 300, such as force data, proximity data, touch data, touch gesture data, pressure data, or other tactile data.

In one example, the tactile data indicates a touch on the curved touchpad of the handheld controller 300, and second tactile data indicates a release of the curved touchpad of the handheld controller 300. In another implementation, the curved touchpad includes proximity sensors and the tactile data includes proximity data, while the second tactile data indicates a disengagement with the proximity sensors.

Figure 9:
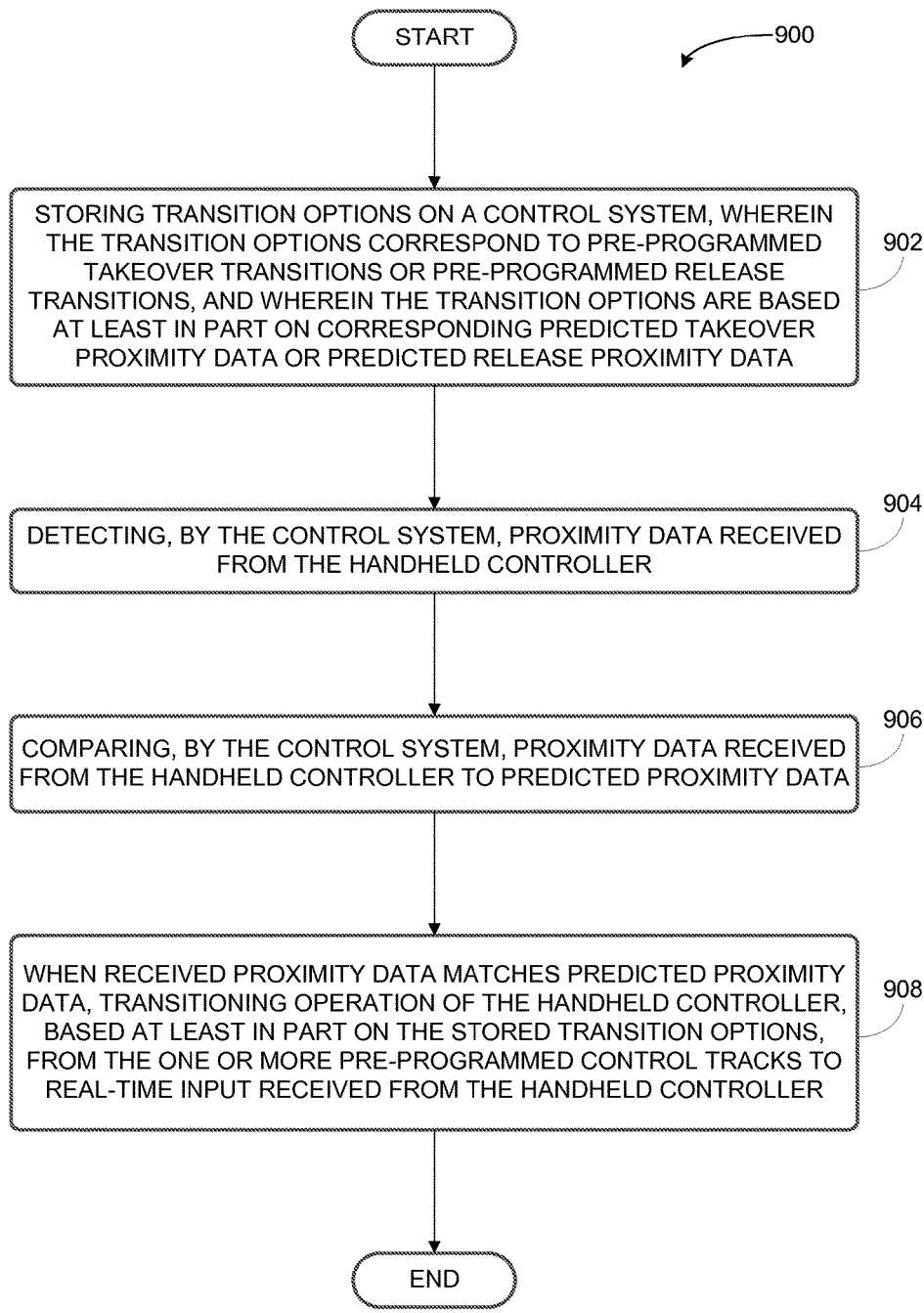
FIG. 9 is an example flowchart for transition options, according to an example implementation.

As illustrated in FIG. 9, and described below in reference to FIG. 9, a quicker punch-in and/or punch-out process may be desired to increase the intuitive control of the system. As such, the control system may be configured to store one or more transition options. The transition options may correspond to punch-in (i.e., takeover) options or punch-out (i.e., release) options. The transition options may be based on expected tactile data (e.g., an incoming trajectory of a user's grasp). The control system may be further configured to play control tracks at the handheld controller and/or robotic component. The control system may be further configured to detect received tactile data (e.g., proximity data related to an incoming trajectory of a user's grip) and compare that received tactile data with the expected tactile data (stored as part of the transition options). When received tactile data matches expected tactile data, the control system may be further configured to transition operation of the handheld controller and/or robotic component, based at least in part on the one or more transition options, from the one or more control tracks to real-time input received from the handheld controller.

Similarly, the control system may be further configured to smooth the punch-out process by using pre-saved takeover options that correspond to expected tactile data. For example, the control system may be further configured to detect additional tactile data and compare the additional tactile data to the expected tactile data. When the additional tactile data matches the expected tactile data, the control system may be configured to transition operation of the handheld controller and/or robotic component from real-time input received from the handheld controller to one or more control tracks.

III. Illustrative Methods

Figure 7:
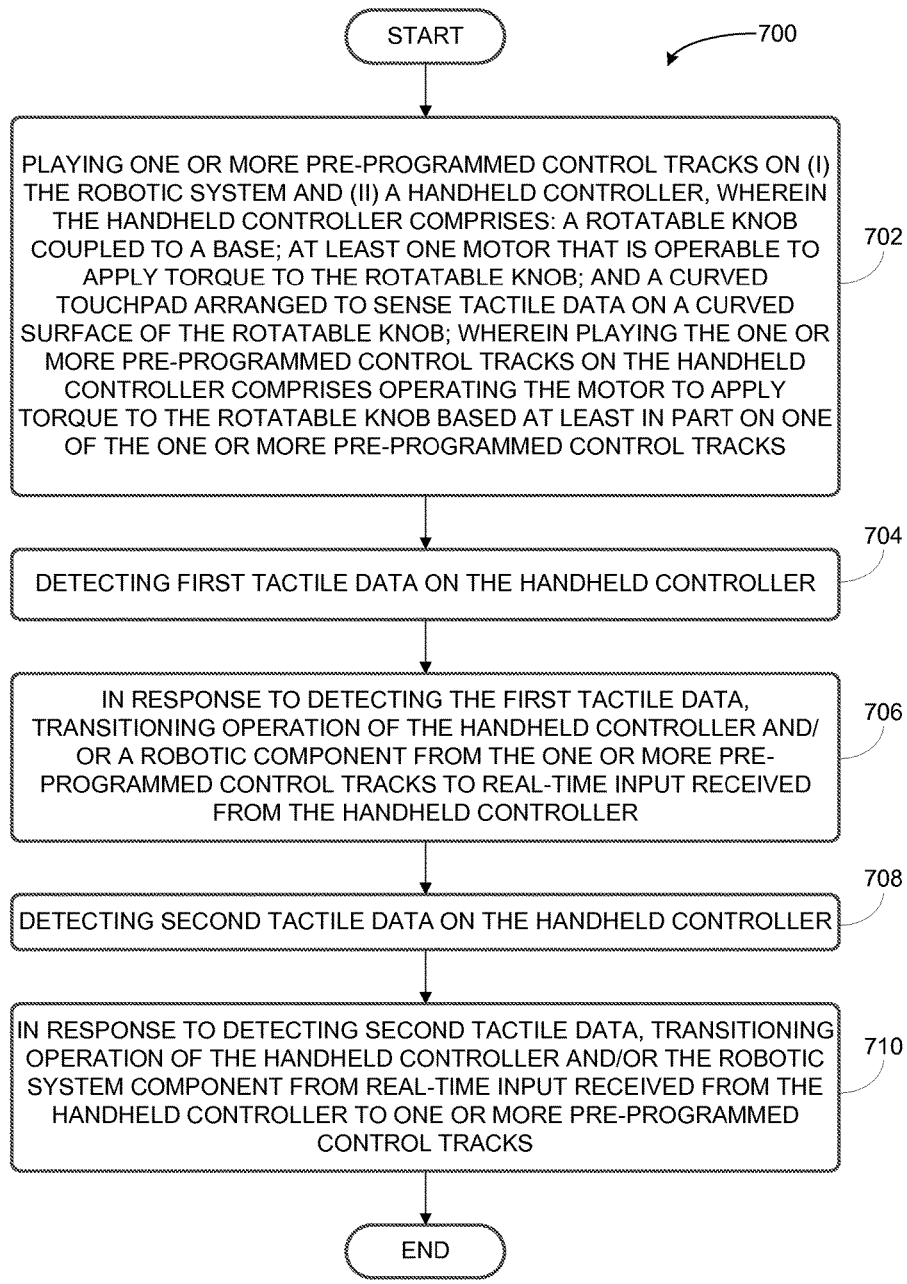
FIG. 7 is an example flowchart for a punch-in or punch-out transition, according to an example implementation.

FIG. 7 is a flowchart illustrating a method 700, according to an example implementation. In particular, method 700 may be implemented to transition operation of a handheld controller, and/or a robotic system component, from a pre-programmed control track to real-time input from the handheld controller (punch-in) and vice versa (punch-out). As noted above, in this application, a "punch-in" refers to a takeover transition (e.g., a transition from a control track to real-time input received from the handheld controller), and a "punch-out" refers to a release transition (e.g., a transition from real-time input received from the handheld controller to performing a control track). To avoid equipment damage and increase intuitive control of the system, transition options may be used to help smoothly punch-in and punch-out.

Method 700 shown in FIG. 7 (and other processes and methods disclosed herein) presents a method that can be implemented within an arrangement involving, for example, the robotic system 100, the robotic arm 118, the computing device 200, tablet 216, handheld controller 300, example handheld controller 300 and/or within the arrangements 400, 500, and 600 shown in FIGS. 4-6 (or more particularly by one or more components or subsystems thereof, such as by a processor and a non-transitory computer-readable medium having instructions that are executable to cause the device to perform functions described herein). Additionally or alternatively, method 700 may be implemented within any other arrangements and systems.

Method 700 and other processes and methods disclosed herein may include one or more operations, functions, or actions as illustrated by one or more of blocks 700-710. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 700 and other processes and methods disclosed herein, each block in FIG. 7 may represent circuitry that is wired to perform the specific logical functions in the process.

At block 702, method 700 involves playing one or more pre-programmed control tracks on (i) the robotic system (e.g., robotic arm 118) and (ii) a handheld controller (e.g., handheld controller 300), where the handheld controller comprises a rotatable knob (e.g., knob 312), at least one motor (e.g., motor 318) operable to apply a torque-generating force to the rotatable knob, and a curved touchpad arranged to sense tactile data on a curved surface of the rotatable knob. In an example implementation, handheld controller may be similar or the same as handheld controller 300 described above and include a rotatable knob coupled to a base, at least one motor that is operable to apply a torque-generating force to the rotatable knob, and a curved touchpad arranged to sense tactile data on a curved surface of the rotatable knob.

Playing a pre-programmed control track may correspond to a robotic system component, or handheld controller, performing a particular function for a period of time. For example, a control track for a robotic component may correspond to movement of a robotic joint (e.g., via an actuator), to use a speaker, or to use a light (e.g., increase or decrease amplitude of an LED or play a pattern on one or more LEDs). Similarly, a control track for a handheld controller may correspond to the handheld controller performing some function (e.g., a motor applying torque to a rotatable knob, applying vibrational feedback to the controller via a motor, lighting an LED, etc.).

At block 704, method 700 involves detecting first tactile data (e.g., touch data from touch sensors 316 on the curved touchpad) on the handheld controller. In an example implementation, tactile data may be received by computing device 200 (or robotic system 100) from handheld controller 300 (e.g., via communication links 402A or 402C). The input data may represent rotation of the knob 312 and/or tactile data received via tactile sensors, such as touch sensors 316, of the handheld controller 300. Moreover, this tactile data may affect one or more aspects of the computing device 200 as further discussed below. Additionally or alternatively, the computing device 200 may process and interpret this input data into one or more operations that should be carried out by one or more components of the robotic system 100. The computing device 200 may then send commands to the robotic system 100 (e.g., via communication link 402B) and the robotic system 100 may carry out these operations based on the received commands.

\Various implementations may generally be discussed below in the context of the handheld controller 300 providing functionality of the robotic system 100 by way of the computing device 200 interpreting input data received from the handheld controller 300. However, other implementations may also be possible. For instance, the handheld controller 300 may control the robotic system 100 directly (e.g., via communication link 402C). As such, any functionality of computing device 200 described herein may be incorporated within the handheld controller 300. Other examples and implementations may also be possible.

In a further aspect, the received input data may be in the form of computer-readable data packets, among other possible forms. Additionally, the input data may be received continuously (e.g., in real-time) or may be received from time-to-time (e.g., periodically). Further, the computing device 200 may receive input data in several separate data packets or in a single data packet. For instance, data representing rotation of the knob 312 and/or touch data may each be received via separate data packets or may all be received via the same data packet, among others. Once the input data is received, some or all of the input data may be stored in a data storage (e.g., data storage 204) and/or processed (e.g., using processors 202) to provide the functionality further discussed below.

At block 706, method 700 involves in response to detecting the first tactile data, transitioning operation of the handheld controller, and/or a robotic component, from the one or more pre-programmed control tracks to real-time input received from the handheld controller. In other words, block 706 involves a punch-in transition. Without limitation, two examples of transitioning operations are (i) a time-decaying takeover and (ii) predicted transitions based on received tactile data (e.g., the control system may store information that predicts what a user intends to do based on the incoming trajectory of the user's grasp). Example transitioning operations are described further below in reference to a time-decaying smoothing takeover and pre-stored transition options.

At block 708, method 700 involves detecting second tactile data (e.g., touch data from touch sensors 316 on the curved touchpad) on the handheld controller. In an example implementation, tactile data may be received by computing device 200 (or robotic system 100) from handheld controller 300 (e.g., via communication links 402A or 402C). The input data may represent rotation of the knob 312 and/or tactile data received via tactile sensors, such as touch sensors 316, of the handheld controller 300. Moreover, this tactile data may affect one or more aspects of the computing device 200 as further discussed above in reference to block 704 of method 700.

At block 710, method 700 involves in response to detecting second tactile data, transitioning operation of the handheld controller and/or the robotic system from real-time input received from the handheld controller to the one or more pre-programmed control tracks. In other words, block 710 involves a punch-out transition from either or both of the handheld controller and a robotic system component.

To improve the punch-in or punch-out process, it may be desirable to smooth the transitions. One way to accomplish this is to use a time-varying transition. FIG. 8 is a block diagram illustrating an example time-decay transition.

Figure 8A:
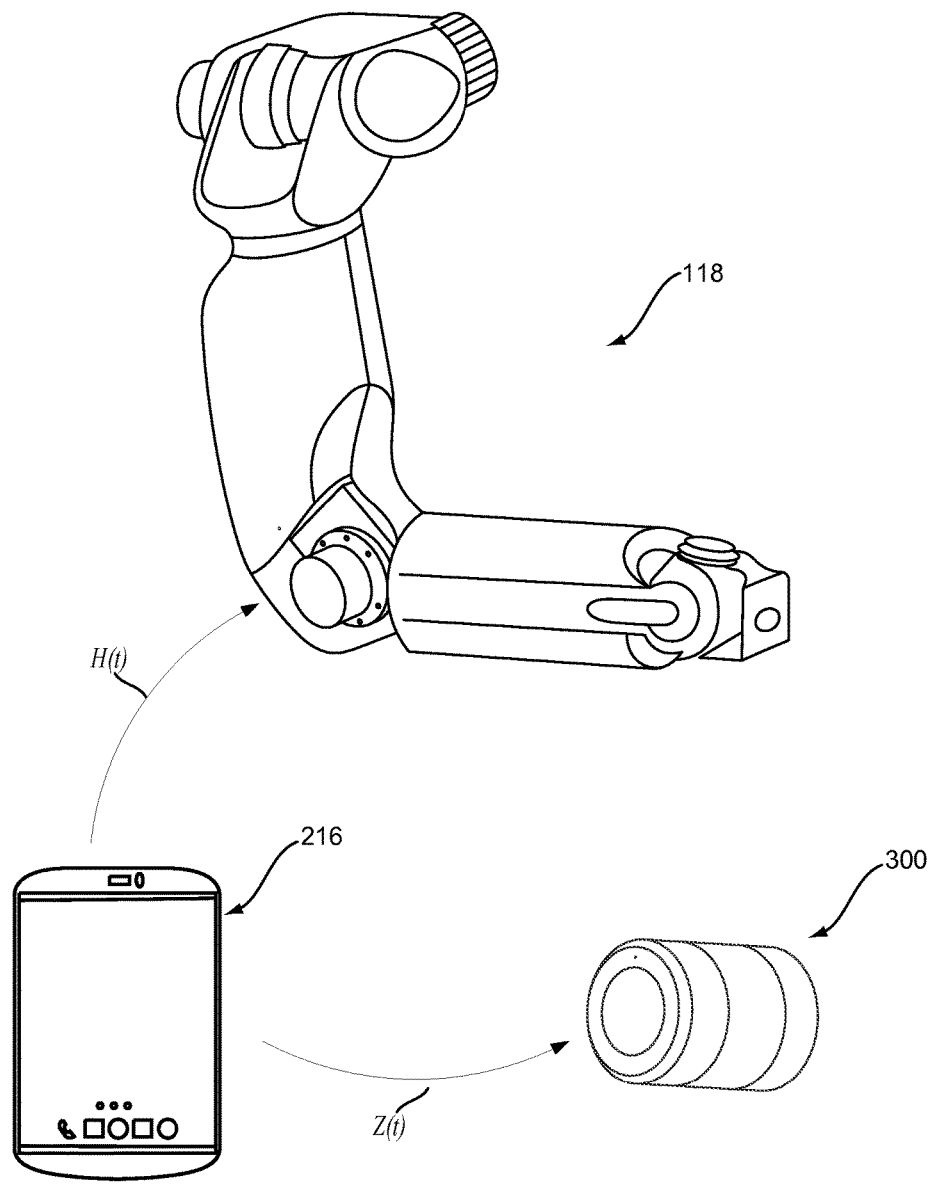
FIGS. 8A and 8B illustrate an example transition option, according to an example implementation.
Figure 8B:
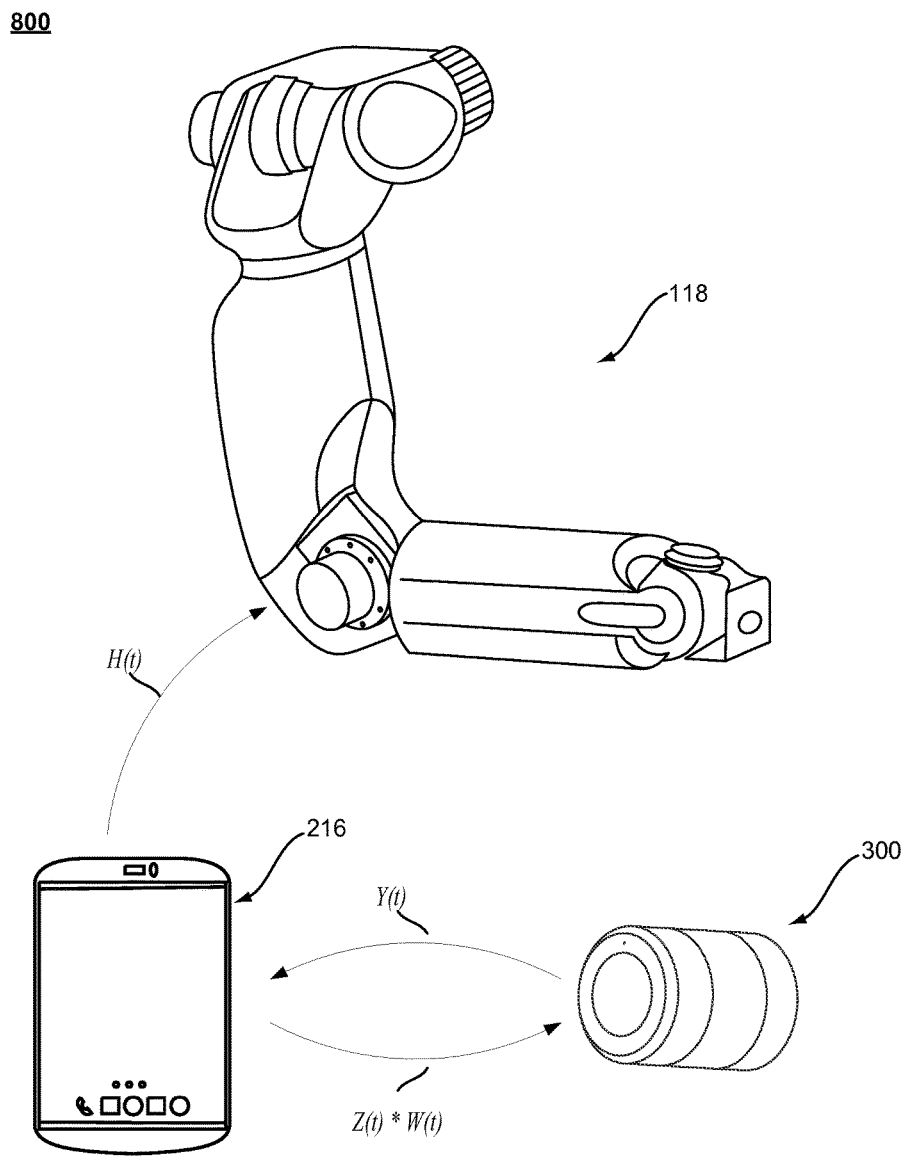
Figure 8C:
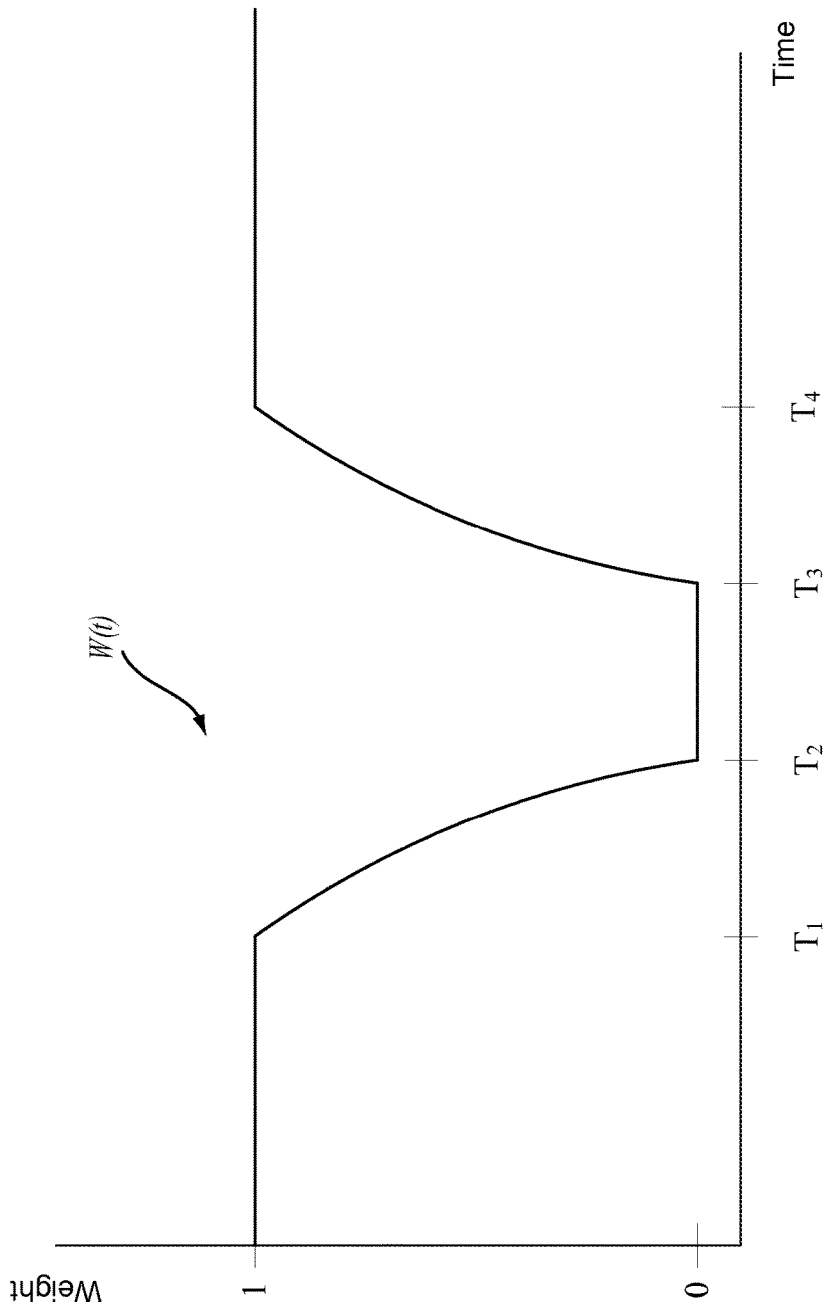
FIG. 8C illustrates an example time-varying weighting function, according to some embodiments.

FIGS. 8A and 8B depict operation of an example system at different points in time, according to some implementations. As discussed below (and illustrated FIGS. 8A-8C), X(t) represents a pre-recorded control track for a robotic component; Y(t) represents rotational user input at the knob; W(t) represents a time-varying weighting function, (e.g., as illustrated in FIG. 8C, W(t) equals one when no touch input is detected and equals zero after a certain period of time from detection of user input); Z(t) represents the handheld controller control signal (e.g., as a function of the pre-defined robot control track); and H(t) represents the pre-defined robot control track multiplied by the time-varying weighting function plus the product of (i) the rotational user input at the knob and (ii) one minus the time-varying weighing function (e.g., after a punch-in, the robot control track is weighted to zero over time and real-time input is weighted to one over time).

X(t)—pre-recorded robot control track
W(t)=time-varying weighting function
Y(t)=rotational user input at the knob
Z(t)=F(X(t))=handheld controller control signal $$H(t)=X(t)*W(t)+(1-W(t))*Y(t)$$

As illustrated in FIG. 8A, a pre-recorded robot control track is being played at the robotic arm 118 and a handheld controller control signal (based on the pre-recorded track) is being played at the handheld controller 300. In this example, no touch input has been detected (or a punch-out has already occurred). The tablet 216 sends X(t) (i.e., an output control signal based on at least one pre-defined robot control track), to the robotic arm 118. The tablet 216 also sends Z(t) (a handheld controller control signal corresponding to the output control signal) to the handheld controller 300.

As illustrated in FIG. 8B, a smoothing transition using a time-varying function is occurring after a punch-in. For example, after detecting a touch input at handheld controller 300, a time-varying weighting function is applied to both the handheld controller control signal and the robot control signal such that these signals go to zero over time and the user input signals are output as the control signals (i.e., the rotational input from the handheld controller 300 takes over operation of the robotic component and the handheld controller).

FIG. 8C illustrates an example time-varying weighting function, according to some implementations. Before times $T_1$ and after time $T_4$, the value of W(t) is 1. In this example, time $T_1$ represents a punch-in event. Here, a time-decay function is applied such that W(t) goes from one at time $T_1$ to zero at time $T_2$. From times $T_2$ to $T_3$, W(t) equals zero such that the output control signal and the handheld controller control signal are weighted to zero. Thus, the rotational user input controls. At time $T_3$, a punch-out occurs and a time-growth function is applied such that W(t) goes from zero at time $T_3$ to one at $T_4$.

In an example implementation, upon detecting tactile information for a punch-in smoothing process (e.g., user grasps the knob), the control system (e.g., tablet 216) may apply an exponential decay function at the controller and robot, via communication links 402A and 402B, such that the value of X(t) (i.e., the respective control track) is weighted to zero over a period of time and Y(t) (i.e., the user input) is weighted to 100% over that period of time. Other example smoothing processes are possible. For example, tablet 216 may use H(t), or a similar function, to smooth transitions at the handheld controller.

FIG. 9 is a flowchart illustrating a method 900, according to an example implementation. In particular, method 900 may be implemented to store a list of transition options corresponding to predicted tactile data (e.g., the incoming trajectory of a user's grasp on the curved touchpad of the handheld controller 300) and use these transition options to increase the speed which the system performs a punch-in or punch-out by avoiding e.g., processing, communications, or delays. This may be useful to increase the control a user experiences to near real-time control (e.g., less than 10 milliseconds delay) after a punch-in or punch-out transition.

Method 900 shown in FIG. 9 (and other processes and methods disclosed herein) presents a method that can be implemented within an arrangement involving, for example, the robotic system 100, the robotic arm 118, the computing device 200, tablet 216, handheld controller 300, example handheld controller 300 and/or within the arrangements 400, 500, and 600 shown in FIGS. 4-6 (or more particularly by one or more components or subsystems thereof, such as by a processor and a non-transitory computer-readable medium having instructions that are executable to cause the device to perform functions described herein). Additionally or alternatively, method 900 may be implemented within any other arrangements and systems.

At block 902, method 900 involves storing transition options on a control system, wherein the transition options correspond to pre-programmed takeover transitions or pre-programmed release transitions, and where the transition options are based at least in part on corresponding predicted takeover proximity data or predicted release proximity data. For example, tablet 216 may be a control system and be configured to receive and store transition options (e.g., on data storage 204). The transition options may be received from an external source, e.g., the internet or user input. Additionally, the transition options may be configurable, e.g., through a user interface such as GUI 600.

At block 904, method 900 involves detecting, by the control system, proximity data received from the handheld controller. For example, tablet 216 may be a control system and receive (via communication link 402A) proximity data from a tactile sensor of the handheld controller 300.

At block 906, method 900 involves comparing, by the control system, proximity data received from the handheld controller to predicted proximity data (e.g., predicted takeover proximity data for a punch-in or predicted release proximity data for a punch-out).

At block 908, method 900 involves, when received proximity data matches predicted proximity data, transitioning operation of the handheld controller (or robotic component), based at least in part on the stored transition options, from the one or more pre-programmed control tracks to real-time input received from the handheld controller.

As noted above, it may be useful to quickly punch-in or punch-out to assist in the intuitive control of the system. To achieve a quick transition, the transition option may use tactile information and pre-saved takeover options. For example, a control system may have pre-saved punch-in, or takeover, options and pre-saved punch-out, or release, options. As one example, a robotic system may be playing two control tracks: (i) a robotic control track instructing a gripper component to close at a medium speed, and (ii) a handheld controller control track instructing the handheld controller to apply a torque-generating force, via a motor, to the rotatable knob in a clockwise direction at a medium speed.

In reference to block 808 and the previous example, when tactile information in received that matches a pre-saved takeover option, the control system plays the pre-saved takeover option, instead of using other transitioning options for the robotic component and/or handheld controller, such as the time-decay function described above.

Robotic component limits may also be incorporated throughout the process to assist in achieving an intuitive control system. For example, a joint limit may be incorporated where, if a gripper is fully opened, the resistance of the motor in that direction at the handheld controller will be greatly increased to reflect the joint limit.

In an example implementation in reference to block 808 and the previous example, the system is operating according to one or more control tracks. For example, the robotic system is performing a robot control track (e.g., a gripper is closing) and the handheld controller is functioning according to the robot control track (e.g., the knob is rotating as a reflection of the gripper closing). Upon detecting tactile data from the handheld controller (e.g., the user grips the knob or approaches the knob in a certain manner), the knob may respond to indicate the user punch-in transition. For example, the motor may go to free spin (i.e., no resistance) for a small period of time, in effect stopping the control track movement of the knob in order to let the user control the component from a blank slate. Alternatively, upon detecting tactile data from the handheld controller, the knob may vibrate (e.g., the motor may provide vibrational feedback), or may perform other functions. For example, a punch-in transition may not occur until both tactile data and a threshold amount of force are detected. In this case, the user may grasp the knob and lightly follow along with movement without initiating a punch-in transition until the threshold force is detected by the control system.

IV. Additional Features

Various time management scenarios are possible. In some implementations, a punch-in may freeze the arrangement of pre-recorded tracks. For example, if punch-in occurs at a certain point in time (e.g., time 612 as shown in FIG. 6) during playback of an arrangement, the robotic system may be configured to save the playback position of the arrangement at that time (e.g., at time 612). After a punch-out, the robotic system picks up where it left off. For example, the robotic system may play the remaining pre-recorded arrangement in the timeline layout to the right of time 612.

Alternatively, a punch-in may slip into the arrangement of pre-recorded tracks. For example, if a punch-in occurs during playback of an arrangement, the robotic system may be configured to continue playing the arrangement in the background (e.g., without sending one or more control signals to the robotic components and/or handheld controller) until a punch-out occurs. Upon punch-out, the robotic system may transition into the rest of the arrangement. In other words, the robotic system would not send control signals to one or more robotic components during the portion of the arrangement that occurs in the times between punch-in and punch-out.

In a further aspect, the computing device 200 can receive user input (e.g., touch-input at the display 218 of the tablet 216) corresponding to selection of a feature (e.g., component) of the robotic system 100 to be operated by the handheld controller 300 (e.g., operated via interpretation of input data by the computing device 200). Responsively, the computing device 200 may cause the handheld controller 300 to operate the selected feature via operation of a particular aspect of the computing device 200. For example, when the example handheld controller 300 is configured to operate an aspect of the tablet 216 such as a GUI, touch-input may be received at the display 218 of the tablet 216. This touch-input may correspond to selection of a particular robotic arm 118 component (e.g., selection using a "drag and drop" selection icon). Selection of the particular component may be from a list of components displayed by a GUI or a model of the robotic arm 118 displayed by a GUI, among other possibilities.

In yet a further aspect, such selection via the computing device 200 may also be used for selecting between (i) control by the handheld controller 300 of the computing device 200 (e.g., particular aspects of the tablet 216) and (ii) control by the handheld controller 300 of the robotic system 100 (e.g., via the computing device 200). Additionally, such selection may also allow for varying functionality of the handheld controller 300. For instance, user input at the computing device 200 may change functionality of the motor such that rotation of the knob 312 can change between operating modes (e.g., "free spin" and providing "detents" during rotation as discussed above). Further, such selection may also allow for varying interpretation of input data received from the handheld controller 300. For instance, user input at the computing device 200 may output data, commands, or other features (e.g., user-input may change the ratios discussed above in relation to the various joints of the robotic system 100). Other instances may also be possible.

While control of the robotic system 100 was discussed above generally in the context of controlling joints of the robotic system 100, such discussion should not be seen as limiting as the example implementations discussed herein may be used for control of a variety of different robotic system 100 components, as well as components/aspects of other devices and machines. In one example, rotation of the knob 312 may allow for control of volume output of a speaker (e.g., a speaker incorporated within the robotic system 100). In another example, rotation of the knob 312 may allow for control of light output from a light source (e.g., a light source incorporated within the robotic system 100). In yet another example, rotation of the knob 312 may allow for control of movement/functionality of an end effector of the robotic system 100. Other examples may also be possible.

V. Conclusion

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A robotic system, comprising:
  a handheld controller, comprising:
    a rotatable knob coupled to a base;
    at least one motor that is operable to apply a torque-generating force to the rotatable knob;
    one or more touch sensors arranged to sense touch input on a curved surface of the rotatable knob; and
  a control system configured to:
    output a robot control signal based on playback of at least one pre-defined robot control track on a robotic system component;
    generate a handheld controller control signal that controls torque applied to the rotatable knob based on the at least one pre-defined robot control track;
    cause the handheld controller to apply torque-generating force to the rotatable knob based on the handheld controller control signal;
    detect a first touch input received from the one or more touch sensors; and
    in response to detecting the first touch input, transition from: (a) causing the handheld controller to apply torque-generating force to the rotatable knob based on the handheld controller control signal and outputting robot control signals based on playback of at least one pre-defined robot control track, to (b) receiving real-time input from the handheld controller and outputting a second control signal to operate robotic system component based on the real-time input from the handheld controller,
    wherein the transition comprises application of a time-varying weighting function to the pre-defined robot control track and a rotational input from the real-time input, wherein the time-varying weighting function decreases weight applied to the pre-defined robot control track and increases weight applied to the rotational input over time.

2. The robotic system of claim 1, wherein, in response to receiving the touch input, the control system is further configured to:
  transition operation of the robotic system component from the robot control signals to real-time input received from the handheld controller.

3. The robotic system of claim 2, wherein the touch input indicates a touch on the curved surface of the handheld controller.

4. The robotic system of claim 2, wherein the one or more touch sensors comprise at least one proximity sensor, and wherein the touch input indicates a proximity to the at least one proximity sensors.

5. The robotic system of claim 1, wherein the control system is further configured to:
   detect second touch input on the handheld controller; and
   in response to detecting the second touch input, transition operation of the handheld controller from real-time input received from the handheld controller to the handheld controller control signal.

6. The robotic system of claim 5, wherein, in response to detecting the second touch input, the control system is further configured to:
   transition operation of the robotic system component from real-time input received from the handheld controller to the robot control signals.

7. The robotic system of claim 5, wherein the second touch input indicates a disengagement of the curved surface of the handheld controller.

8. The robotic system of claim 5, wherein the one or more touch sensors comprise at least one proximity sensor, and wherein the second touch input indicates a disengagement of the at least one proximity sensor.

9. A method for a robotic system, comprising:
   outputting a robot control signal based on playback of at least one pre-defined robot control track on a robotic system component;
   generating a handheld controller control signal for a handheld controller comprising a rotatable knob coupled to a base, at least one motor operable to apply torque-generating force to the rotatable knob, and one or more touch sensors arranged to sense touch data on a curved surface of the rotatable knob, wherein the handheld controller control signal controls torque applied to the rotatable knob based on the at least one pre-defined robot control track;
   causing the handheld controller to apply torque-generating force to the rotatable knob based on the handheld controller control signal;
   detecting first touch input based on touch data from the one or more touch sensors; and
   in response to detecting the first touch input, transitioning from: (a) causing the handheld controller to apply torque-generating force to the rotatable knob based on the handheld controller control signal and output robot control signals based on playback of at least one pre-defined robot control track, to (b) receiving real-time input from the handheld controller and outputting a second control signal to operate robotic system component based on the real-time input from the handheld controller
   wherein transitioning comprises, during a transition period, applying a time-varying weighting function to the pre-defined robot control track and a rotational input from the real-time input, wherein the time-varying weighting function decreases weight applied to the pre-defined robot control track and increases weight applied to the rotational input over the transition period.

10. The method of claim 9, further comprising:
    in response to detecting the first touch input, transitioning operation of at least one robotic component of the robotic system from the robot control signals to real-time input received from the handheld controller.

11. The method of claim 9, wherein the first touch input indicates a user touch on the curved surface.

12. The method of claim 9, further comprising:
    detecting second touch input on the handheld controller;
    in response to detecting the second touch input, transitioning operation of the at least one robotic component of the robotic system from real-time input received from the handheld controller to the robot control signals.

13. The method of claim 12, further comprising:
    in response to detecting the second touch input, transitioning operation of the handheld controller from the handheld controller control signal to real-time input received from the handheld controller, wherein the second touch input indicates a disengagement from the curved surface.

14. The method of claim 9, wherein transitioning operation of the handheld controller further comprises:
    storing transition options on a control system, wherein the transition options correspond to pre-programmed takeover transitions or pre-programmed release transitions, and wherein the transition options are based at least in part on corresponding predicted takeover proximity data or predicted release proximity data;
    detecting, by the control system, proximity data received from the handheld controller;
    comparing, by the control system, proximity data received from the handheld controller to predicted proximity data; and
    in response to receipt of proximity data that matches the predicted proximity data, transitioning operation of the handheld controller, based at least in part on the one or more transition options, from the handheld controller control signal to real-time input received from the handheld controller.

15. A robotic system, comprising:
    a handheld controller, comprising:
       a rotatable knob coupled to a base;
       at least one motor that is operable to apply a torque-generating force to the rotatable knob;
       one or more touch sensors arranged to sense touch data on a curved surface of the rotatable knob; and
    a control system configured to:
       output a robot control signal based on playback of at least one pre-defined robot control track on a robotic system component;
       store one or more transition options, wherein the one or more transition options correspond to pre-programmed takeover transitions or pre-programmed release transitions, or both, and wherein the one or more transition options are based at least in part on corresponding expected takeover proximity data or expected release proximity data;
       generate a handheld controller control signal that controls torque applied to the rotatable knob based on the at least one pre-defined robot control track;
       cause the handheld controller to apply torque-generating force to the rotatable knob based on the handheld controller control signal;
       detect proximity data received from the one or more proximity sensors;
       compare received proximity data to expected takeover proximity data; and
       in response to receipt of proximity data that matches the expected takeover proximity data, transition, based at least in part on the one or more transition options, from (a) causing the handheld controller to apply torque-generating force to the rotatable knob based on the handheld controller control signal to (b) receiving real-time input from the handheld controller and outputting a second control signal to operate robotic system component based on the real-time input from the handheld controller,
wherein one of the transition options comprise specifies a transition period, and application of a time-varying weighting function to the pre-defined robot control track and a rotational input from the real-time input, wherein the time-varying weighting function decreases weight applied to the pre-defined robot control track and increases weight applied to the rotational input over the transition period.

16. The robotic system of claim 15, wherein the control system is further configured to:
output robot control signals to a robotic system component; and
in response to receipt of proximity data that matches the expected takeover proximity data, transition operation of the robotic system component, based at least in part on the one or more transition options, from the one or more robot control signals to real-time input received from the handheld controller.

17. The robotic system of claim 16, wherein the control system is further configured to:
detect additional proximity data;
compare additional proximity data to expected release proximity data; and
in response to a determination that the additional proximity data matches the expected release proximity data, transition operation of the handheld controller from the real-time input received from the handheld controller to the handheld controller control signal.

18. The robotic system of claim 17, wherein, when additional proximity data matches expected release proximity data, the control system is further configured to transition operation of the robotic system component from the real-time input received from the handheld controller to the one or more robot control signals.

19. The robotic system of claim 18, wherein the robotic system component comprises an actuator corresponding to a particular joint of the robotic system.

20. The robotic system of claim 19, wherein the operation of the robotic component comprises movement of the particular joint based on the rotation of the knob.

* * * * *